United States Patent
Yun et al.

(10) Patent No.: US 7,580,427 B2
(45) Date of Patent: Aug. 25, 2009

(54) METHOD FOR RETRANSMITTING DATA THROUGH A REVERSE LINK IN PACKET DATA COMMUNICATION SYSTEM USING AUTOMATIC REPEAT REQUEST

(75) Inventors: Young Woo Yun, Seoul (KR); Young Jo Lee, Kunpo-shi (KR); Ki Jun Kim, Seoul (KR); Soon Yil Kwon, Kunpo-shi (KR); Suk Hyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 1015 days.

(21) Appl. No.: 10/101,220

(22) Filed: Mar. 20, 2002

(65) Prior Publication Data

US 2002/0176362 A1    Nov. 28, 2002

(30) Foreign Application Priority Data

Mar. 21, 2001 (KR) ............ 10-2001-0014696
Sep. 10, 2001 (KR) ............ 10-2001-0055518

(51) Int. Cl.
*H04J 3/18* (2006.01)
(52) U.S. Cl. ............ 370/477; 370/537; 455/522
(58) Field of Classification Search ............ 370/477, 370/537; 455/522
See application file for complete search history.

(56) References Cited

U.S. PATENT DOCUMENTS

| | | | | |
|---|---|---|---|---|
| 6,084,904 A * | 7/2000 | Wang et al. | ............ | 375/130 |
| 6,167,273 A * | 12/2000 | Mandyam | ............ | 455/450 |
| 6,212,659 B1 * | 4/2001 | Zehavi | ............ | 714/755 |
| 6,367,045 B1 * | 4/2002 | Khan et al. | ............ | 714/748 |
| 6,385,184 B2 * | 5/2002 | Kitade et al. | ............ | 370/337 |
| 6,977,888 B1 * | 12/2005 | Frenger et al. | ............ | 370/218 |
| 7,072,307 B2 * | 7/2006 | Tong et al. | ............ | 370/253 |
| 7,310,340 B2 | 12/2007 | Seidel et al. | | |
| 2001/0034209 A1 * | 10/2001 | Tong et al. | ............ | 455/69 |
| 2002/0046379 A1 | 4/2002 | Miki et al. | | |
| 2003/0235160 A1 | 12/2003 | Saifuddin | | |
| 2005/0128964 A1 * | 6/2005 | Tiedemann et al. | ......... | 370/278 |
| 2005/0190718 A1 | 9/2005 | Holtzman et al. | | |

FOREIGN PATENT DOCUMENTS

| | | |
|---|---|---|
| JP | 2001-217771 | 8/2001 |
| KR | 1999-0086015 | 2/2001 |

(Continued)

OTHER PUBLICATIONS

Korean Office Action dated Jun. 26, 2007.

(Continued)

*Primary Examiner*—Jason E Mattis
(74) *Attorney, Agent, or Firm*—McKenna Long & Aldridge LLP

(57) ABSTRACT

Disclosed is a mobile communication systems, and more particularly, a method of retransmitting data through a reverse link in a packet data system using ARQ (automatic repeat request). The present invention discloses a method for retransmitting data through a reverse link in Packet Data communication system using automatic repeat request(ARQ) adjusting data retransmission energy to be reduced at a predetermined ratio of one receiving energy for an initial data transmission to other receiving energy for a data retransmission.

8 Claims, 14 Drawing Sheets

| | FOREIGN PATENT DOCUMENTS | |
|---|---|---|
| KR | 2001-0031941 | 4/2001 |
| KR | 2002-0074739 | 10/2002 |
| KR | 2002-0081529 | 10/2002 |
| WO | WO 99/26371 | 5/1999 |
| WO | WO99/26371 | 5/1999 |
| WO | WO 00/19634 | 4/2000 |

OTHER PUBLICATIONS

Korean Notice of Allowance dated Sep. 26, 2008.

* cited by examiner

FIG. 9
R-NPDCH
| //1// | 2 | 3 | //4// | 5 | 6 | 7 |
R-RPDCH
| 1 | 2 | ⊠3(1')⊠ | 4 | 5 | ⊠6(4')⊠ | 7 |
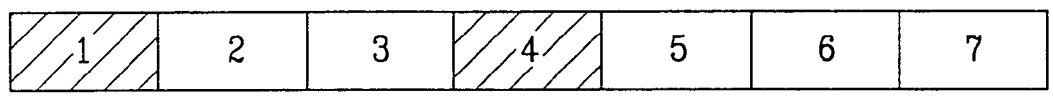 "NACK" generated frame in R-NPDCH
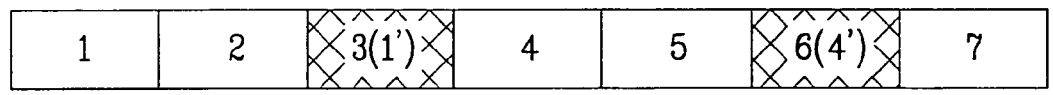 retransmission frame in R-RPDCH

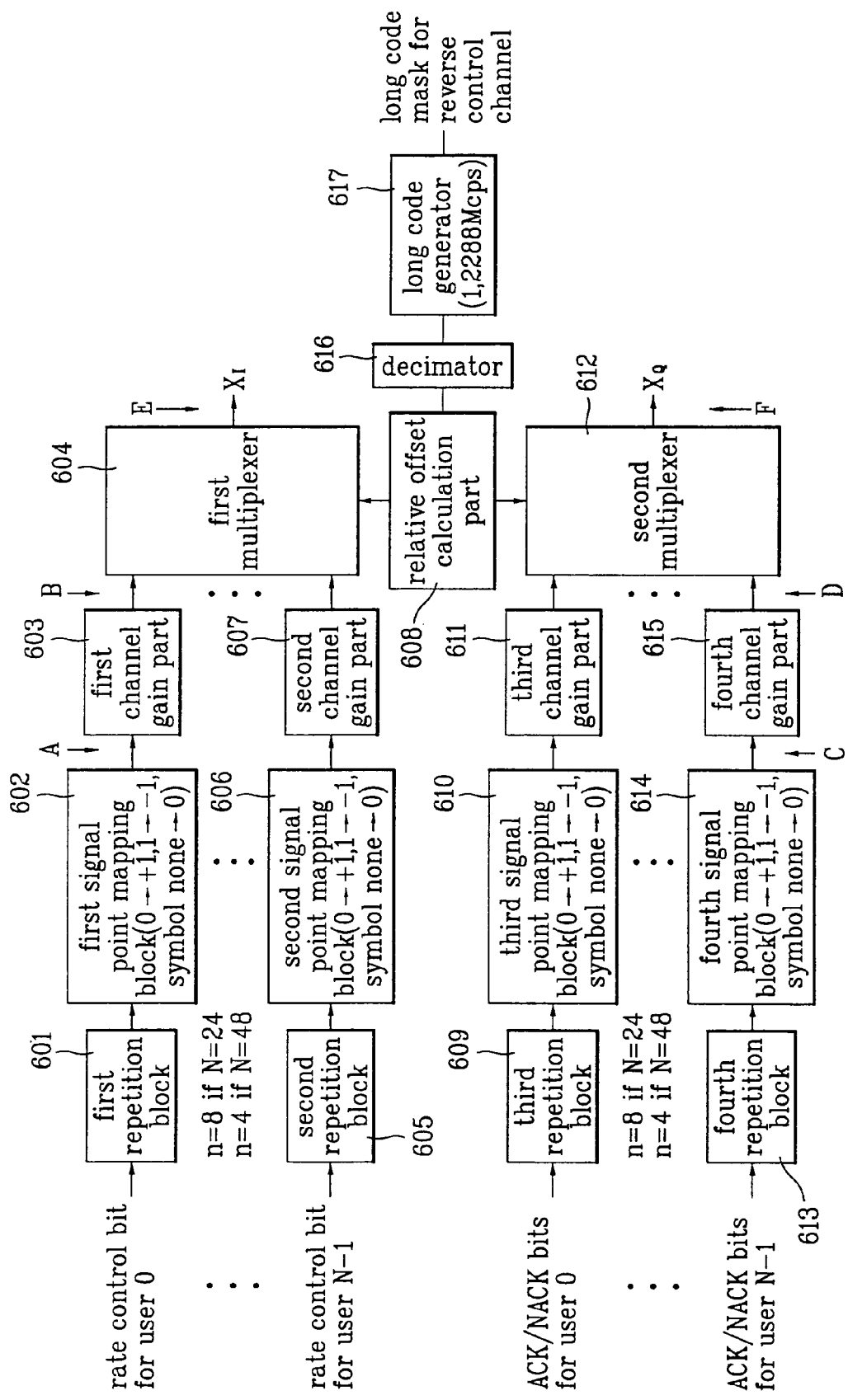

METHOD FOR RETRANSMITTING DATA THROUGH A REVERSE LINK IN PACKET DATA COMMUNICATION SYSTEM USING AUTOMATIC REPEAT REQUEST

This application claims the benefit of the Korean Application Nos. P2001-14696 and P2001-55518 filed on Mar. 21, 2001 and Sep. 10, 2001, respectively, which are hereby incorporated by reference.

BACKGROUND OF THE INVENTION

1. Field of the Invention

The present invention relates to a mobile communication system, and more particularly, to a method of retransmitting data through a reverse link in a packet data system using ARQ(automatic repeat request)

2. Discussion of the Related Art

Generally, 1× DO(data only) is a mobile communication technique enhancing data transmission rate over 2 Mbps from cdma2000-1× called the 2.5 generation mobile communication. On the contrary, 1×-EV DV is a service system realizing a data transmission rate of 2~3 Mbps in a mobile section as well as supporting a voice service.

Namely, 1×-EV DV is a general term for the standardization enabling to support a high-speed packet data service as well as the previous voice service based on 1× technology of synchronous cdma2000 RTT.

Compared to the previous 1× RTT technology, 1×-EV DV accepts an adaptive modulation & coding(hereinafter abbreviated AMC) technique and an HARQ system in a forward link . Yet, for a reverse link, channel addition to support the AMC technology and HARQ system is just made thereto.

Generally, link adaptation includes power control and rate control.

In the rate control, a receiving end adjusts a rate of a transmission terminal through power variation of a received signal, for which a power level of the signal received by the receiving end should fluctuate.

Yet, an objective of the power control is to control to lead a level of power, which is received by the receiving end, into a level in which modulation and coding techniques used by the current radio operate at a demanded level. Hence, it is difficult to use both of the power control and the AMC technique simultaneously.

The power control settles a near-far problem occurring at a reverse link. An objective of the power control is to adjust power levels of all terminals received by a base transceiver system into a predetermined level by differing transmission powers of the terminal far from the base transceiver system to the terminal near to the base transceiver system.

Compared to the forward link, the reverse link has the near-far problem in general so as to need the power control absolutely. Therefore, it is difficult to apply the same AMC technique of the forward link thereto.

Meanwhile, the HARQ system combines HARQ(automatic repeat request) through error detection with the previous forward error restoration coding system.

Generally, there are three kinds of the HARQ systems, Type-I of the HARQ system, then an error occurs at the first transmission, retransmits the same information so that a receiving side uses a chase combining form.

Type-II and type-III of the HARQ systems increase redundancy in the respective transmissions. A receiving side combines code of the first transmission signal with that of retransmission signal so as to reduce a code rate. Namely, compared to the type-I of the HARQ system, type-II and type-III of the HARQ systems attain coding gains, respectively.

In this case, a classification between type-II and type-III of the HARQ systems is made in a following manner. The type-II is taken if each of the transmission information fails to be self-decodable. Andy the type-III is taken if each of the transmission information is self-decodable.

There exists dissimilarity between the forward and reverse link channels. Such dissimilarity makes it difficult to apply the technologies of increasing data throughput in the previous forward link to the reverse.

Generally, the HARQ system considered by the current reverse link takes care of the following items.

First, if a turbo code rate is ¼, a receiving end uses the type-I of HARQ and applies chase combining thereto.

Second, if the turbo code rate is ½. the receiving end uses both of the type-II and the type-III of HARQ so as to use the incremental redundancy.

The use of such systems is supported by the fact that a minimum code rate of the turbo code as an encoding system is ⅕.

The first system, when the turbo code of ¼ code rate is used, having already attained a sufficient coding gain, has no big difference of gain in using the incremental redundancy.

And, the second system enables to attain a big coding gain using the incremental redundancy when the code rate is ½.

There occur some problems in using the above-mentioned systems.

For reference, a redundancy code is a code that a redundant code series are added to the code series required for expressing original information in order to detect or amend errors occurring in the process of transmitting data, which is called "redundancy" in brief. When a packet having NACK is retransmitted it is called "incremental redundancy" that another redundancy having failed to be transmitted in the previous packet is transmitted.

First of all, as explained in the foregoing description, the power control is carried out so as to keep a predetermined level of quality by adjusting a level of receiving power in the reverse link.

Yet, when the chase combining of the first system is used, the retransmission consumes excessive energy amounting to that of the first transmission in result.

Namely, even though the packet error in the reverse, link can be settled mostly by adding little energy to the energy. of the first transmission, a signal having the same energy of the first transmission signal is retransmitted so as to waste energy.

Moreover, when the receiving end executes the chase combining, it is unable to apply the dedicate data rate control for the reverse link traffic, which is currently being considered, to the packet to be retransmitted.

Therefore, a new link adaptation method is required in order to settle the problem of the first system as well as increase the advantageous coding gain of the second system.

SUMMARY OF THE INVENTION

Accordingly, the present invention is directed to a data transmission method that substantially obviates one or more problems due to limitations and disadvantages of the related art.

An object of the present invention is to provide a link adaptation method and system thereof using a hybrid automatic retransmission demand system in a reverse link so as to control effectively power and data rate in the reverse link.

Another object of the present invention is to provide a link adaptation method and system thereof enabling to prevent waste of transmission energy by controlling power of a retransmitted signal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for re-transmitting data through a reverse link in Packet Data communication system using automatic repeat request (ARQ) adjusts data retransmission energy to be reduced at a predetermined ratio of one receiving energy for an initial data transmission to other receiving energy for a data retransmission.

In another aspect of the present invention, a data retransmission method includes mapping a transmission energy corresponding to at least one data rate, allocating a portion of a transmission energy determined by a reverse data rate control to the retransmission data and the rest portion of the transmission energy to a new transmission data to be transmitted, and transmitting the retransmission and new transmission data so as to correspond to the respective allocated transmission energy.

In another aspect of the present invention, a data retransmission method includes updating an effective data rate in accordance with at least one data rate control command, comparing the updated effective data rate to a data rate when a retransmission data to be retransmitted is initially transmitted, determining a data rate of a new transmission data to be transmitted and a transmission energy of the retransmission data in accordance with the comparison result, and transmitting the new transmission data and the retransmission data to correspond to the determined data rate of the new transmission data and the determined transmission energy.

In another aspect of the present invention, a data retransmission method includes the steps of receiving whether a retransmission of a data previously transmitted is carried out or not through an independent physical channel or a common channel for a dedicate data rate controls mapping a transmission energy corresponding to at least one data rate, allocating a portion of the transmission energy determined by the data rate control to a retransmission data to be retransmitted and another portion of the transmission energy to a new transmission data to be transmitted, and transmitting the retransmission data and the new transmission data corresponding to the allocated transmission energies.

In another aspect of the present invention, a data transmission method using an Automatic Repeat reQuest(ARQ) through a reverse link in a packet data communication system controls data retransmission energy to be reduced at a predetermined ratio of first transmission energy.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 illustrates diagrams of multiplexed R-NPDCH for an initial transmission and R-RPDCH for a retransmission according to the second embodiment of the present invention;

FIG. 12 illustrates a block diagram of a channel for ACK/NACK transmission and a channel multiplexing a reverse rate control channel according to the second embodiment of the present invention.

DETAILED DESCRIPTION OF THE INVENTION

Figure 1:
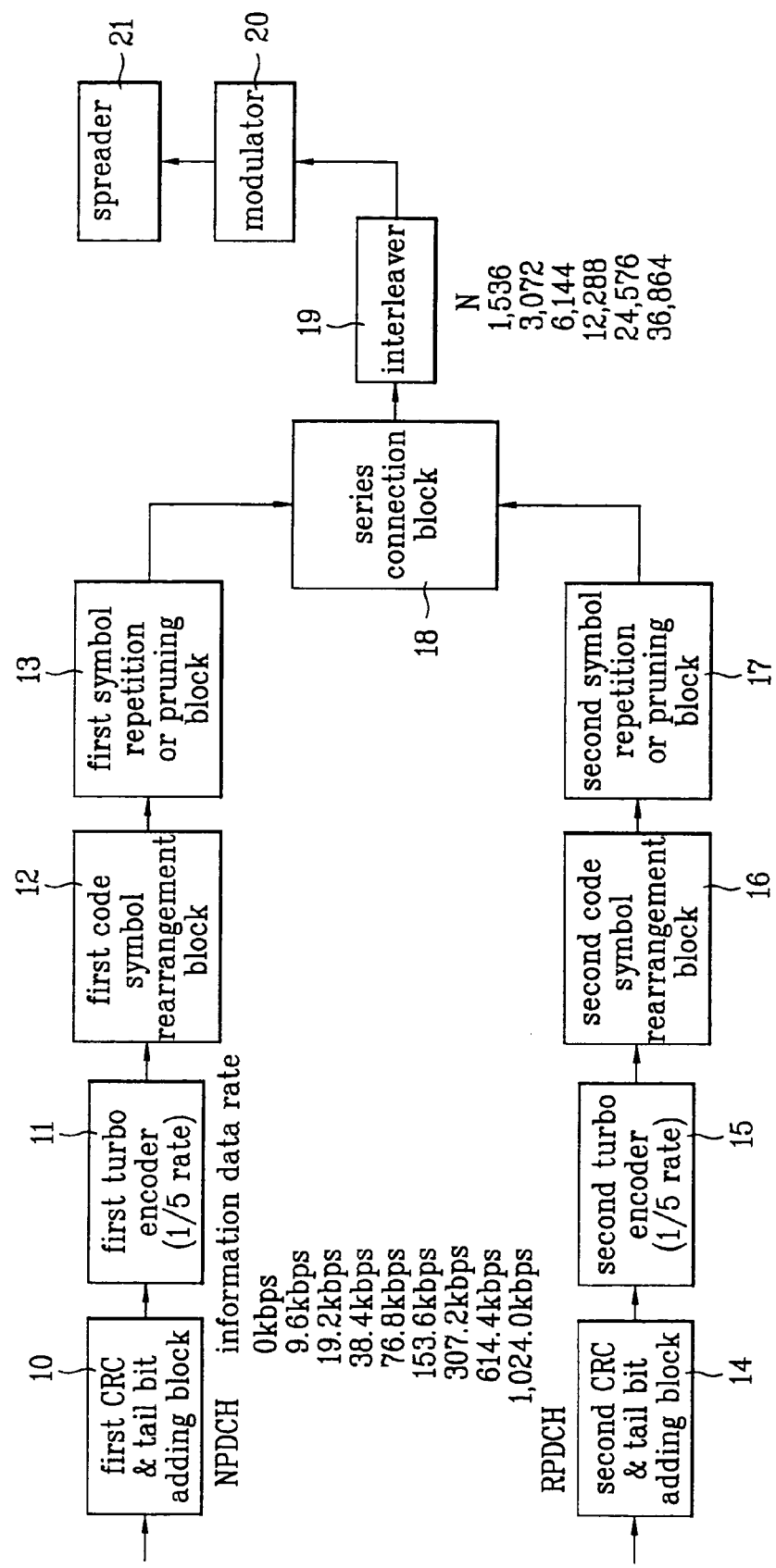
FIG. 1 illustrates a functional block diagram of generating a transmission signal using a TDrM system according to a first embodiment of the present invention.

Reference will now be made in detail to the preferred embodiments of the present invention, examples of which are illustrated, in the accompanying drawings. Wherever possible, the same reference numbers will be used throughout the drawings to refer to the same or like parts.

The present invention proposes a method of combining a system of supporting HARQ effectively in a reverse link with a dedicate control system for a data rate of a reverse traffic.

FIRST EMBODIMENT

A first embodiment according to the present invention uses an incremental redundancy code in all cases of retransmission regardless of a code rate, whereby excessive energy consumption is prevented on retransmission.

Moreover, when there exist data to be retransmitted, transmission energy of the retransmitted data is adjusted so that the receiving energy of the data to be retransmitted will become a portion of the receiving energy when the retransmitted data are initially transmitted. For instance, the retransmission energy, which enables ¼ or ⅛ energy compared to the receiving energy to the initial transmission energy to be received by the retransmission data, is allocated to the retransmission for the use.

Besides, the energy to be used possibly in a packet to be transmitted may be determined in accordance with a data rate determined by a reverse link dedicate rate control. In this case, a portion of the currently usable energy allowed by the dedicate rate control except the other energy portion required for the retransmission is used as energy for data to be newly transmitted.

And, when NAK(non-acknowledgement) is transferred from a receiving end for a packet transmitted at the data rate determined by the reverse link dedicate rate control, a transmission end determines a data rate of the data to be retransmitted and another data rate of the data to be newly transmitted, and then multiplexes to transmit packets generated from these data rates.

In this case, the data rate of the data to be retransmitted is determined as a data rate at which the data, to be retransmitted is initially transmitted. And, the data rate of the data to be newly transmitted, as explained in the foregoing description, is properly adjusted in a manner that the transmission energy of the data to be retransmitted is controlled so that the receiving energy of the retransmitted data will become a predetermined % of the receiving energy at the initial transmission of the data to be retransmitted.

Methods of multiplexing a packet for the retransmission and a packet for the new transmission are mainly divided into code division multiplexing(hereinafter abbreviated CDM) and time division multiplexing(hereinafter abbreviated TDM).

First, a transmission end in a TDM system has a predetermined data rate in accordance with a reverse dedicate rate control, and generates a code symbol having a demanded interleaver length in accordance with the data rate. For this, a code symbol of the data to be newly transmitted and a code symbol of the data to be retransmitted are generated separately, and then the generated symbols are multiplexed in due time. Thereafter, a transmission system undergoes through a modulation process and a spreading process. In this case, the retransmission packet and the packets for new transmission use one common Walsh code and are transmitted through one common physical channel. Such a process is explained in detail as follows by referring to FIG. 1.

FIG. 1 illustrates a functional block diagram of generating a transmission signal using a TDM system according to a first embodiment of the present invention, in which a count of retransmission for an error-occurring packet is limited to 1 by a transmission end.

Referring to FIG. 1, a system of generating a transmission signal using TDM according to the present invention includes CRC & tail bit adding blocks 10 and 14 adding CRC(cylic redundancy code) for an error check and a tail bit to data, to be newly transmitted or data of the previously transmitted data to be retransmitted, turbo encoders 11 and 15 encoding outputs of the blocks 10 and 14 into turbo codes of ⅕ code rate, first and second symbol rearrangement blocks 12 and 16 rearranging orders of encoded code symbols so as to divide the encoded code symbols into redundancy codes to be transmitted and redundancy codes not to be transmitted, respectively, symbol repetition or pruning blocks 13 and 17 generating code symbol streams having demanded lengths by symbol repetition or pruning of the rearranged code symbols (i.e. symbol-repeating or pruning the rearranged code symbols so as to generate code symbol streams of the demanded lengths corresponding to transmission energy allocated to the data to be newly transmitted or to be retransmitted, a series connection block 18 generating one code symbol stream from the respective symbol-repeated or pruned code symbols, an interleaver 19 interleaving the multiplexed code symbol stream, a modulator 20 modulating the interleaved code symbol stream, and a spreader 21 spreading the modulated code symbol stream using one Walsh, code.

Namely, the transmission end has generation blocks each of which includes the CRC & tail bit adding block 10 or 14 to generate a new transmission packet to transmit new information and a retransmission packet, the turbo encoder 11 or 15, the interleaver 19, and the symbol repetition or pruning block 13 or 17. The generation blocks increase in proportional to a count of retransmission of random data.

Therefore, the CRC & tail bit adding block 10 or 14 adds the CRC for the error check and, the tail bit to an information bit the receiving end wants to transmit.

The turbo encoder 11 or 15 encodes the bit stream to which the CRC and tail bit are added into the turbo code having the ⅕ code rate.

The first or second symbol rearrangement block 12 or 16 rearranges the order of the code symbols encoded into the turbo code. Namely, the symbol rearrangement blocks 12 and 16 rearrange the orders of the input code symbols so as not to carry out the interleaving in order to change a bust error into a random error as a channel interleaver of the related art but to support an incremental redundancy effectively.

In other words, the orders of the code symbols are adjusted properly so as to divide the currently generated transmission signal into the redundancy code included in the new transmission packet to be transmitted and the other redundancy code included in the retransmission packet to be transmitted (the redundancy code failing to be included in the previous transmission signal)s Such an operation of the symbol rearrangement block 12 or 16 enables a symbol repetition or pruning process of a next stage to be executed with ease.

The symbol repetition or pruning block 13 or 17 symbol-repeats or prunes the order-rearranged code symbols as many as a predetermined count of symbols in order to meet a count of the encoded symbols with transmission energy allocated to the new transmission and the retransmission respectively.

Figure 2:
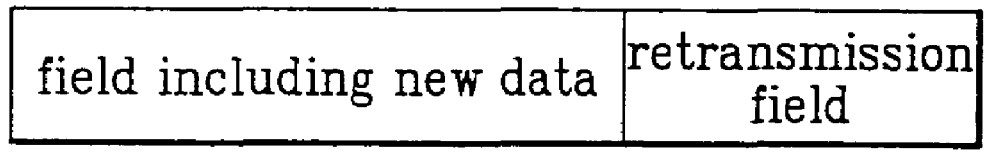
FIG. 2 illustrates a diagram of an output result of a series connection block in FIG. 1.

The series connection block time-multiplexes the respective symbols symbol-repeated or pruned by the symbol repetition or pruning blocks 13 and 17 so as to generate one stream. Such a generated stream, as shown in FIG. 2, fills its upper field with the code symbols representing the new information and its lower field with the code symbols consisting of the redundancy codes failing to be transmitted in the previous transmission signal.

And, the interleaver 19 interleaves the respective code symbols in the upper and lower fields in the above-filled code symbols.

Thereafter, the code symbols are modulated by the modulator 20, and then spread by the spreader 21 using one Walsh code.

Table 1 illustrates the energy allocating amount for a reverse link HARQ system constructed using TDM on the assumption that the transmission end allows the retransmission once. This example assumes that the retransmission energy is allocated in a manner that only 25% of the receiving energy for the initial transmission energy of the corresponding retransmission data is basically received on retransmission.

TABLE 1

| R/eng. | 1 | | 2 | | 4 | | 8 | | 16 | | 32 | | 64 | | 107 | |
|---|---|---|---|---|---|---|---|---|---|---|---|---|---|---|---|---|
| N/eng. | R | N | R | N | R | N | R | N | R | N | R | N | R | N | R | N |
| 1 | 1 | 0 | 1 | 1 | 1 | 2+R | 1 | 4+R | 1 | 8+R | 1 | 16−P | 1 | 32+R | 1 | 64+R |
| 2 | 1 | 0 | 1 | 1 | 1 | 2+R | 1 | 4+R | 1 | 8+R | 1 | 16−P | 1 | 32+R | 1 | 64+R |
| 4 | 1 | 0 | 1 | 1 | 1 | 2+R | 1 | 4+R | 1 | 8+R | 1 | 16−P | 1 | 32+R | 1 | 64+R |
| 8 | 1 | 0 | 2 | 0 | 2 | 2 | 2 | 4+R | 2 | 8+R | 2 | 16−P | 2 | 32+R | 2 | 64+R |
| 16 | 1 | 0 | 2 | 0 | 4 | 0 | 4 | 4 | 4 | 8+R | 4 | 16−P | 4 | 32+R | 4 | 64+R |
| 32 | 1 | 0 | 2 | 0 | 4 | 0 | 8 | 0 | 8 | 8 | 8 | 8 | 8 | 32+R | 8 | 64+R |
| 64 | 1 | 0 | 2 | 0 | 4 | 0 | 8 | 0 | 16 | 0 | 16 | 16 | 16 | 32+R | 16 | 64+R |
| 107 | 1 | 0 | 2 | 0 | 4 | 0 | 8 | 0 | 16 | 0 | 32 | 0 | 32 | 32 | 32 | 64+R |

(eng.: energy, R: retransmission, N: new transmission)

In the TDM system according to the present invention, a set of the data rate enabling to be adjusted by the dedicate rate control consists of 8 elements of {9.6 kbps, 19.2 kbps, 38,4 kbps, 76.8 kbps, 153.6 kbps, 307.2 kbps, 614.4 kbps, 1024 kbps}.

In this case, assuming that total energy for the transmission of the data rate of 9.6 kbps is 1, energy for the rest data rate is normalized as 2, 4, 8, 16, 32, 64, and 107.

Therefore, when the energy allocated to the data on new transmission or retransmission is 1, 2, 4, 8, 16, 32, 64, and 107 in Table 1, a lower field of a transmission signal at the point of determining the retransmission, as shown in FIG. 2, includes code symbols containing a redundancy code failing to be transmitted by the previous transmission signal. And, ¼ of the receiving energy for the initial transmission energy of the corresponding retransmission energy, as shown in Table 1, is allocated to the energy allocated to the code symbols. Moreover, once the retransmission is determined, energy for the incremental redundancy code of the retransmission data is allocated in the first place as well as the rest energy is allocated to the newly transmitted data.

Hence, on retransmission, the sum of the newly transmitted data and the transmission energy allocated to the retransmitted data will not to exceed the transmission energy determined by the data rate control.

When such a TDM system is used, one of the problems, which may occur, is that it is impossible to meet a count of the code symbols after the completion of multiplexing the respective code symbols only using the set of the previous data rates.

For instance, when a packet including random information is transmitted initially, it is assumed that the initially transmitted packet is transmitted at a speed of 76.8 kbps and at a time point of re-transmitting the packet, the mobile station is allowed to transmit with a speed of 153.6 kbps by a reverse link dedicate rate control. And, it is also assumed that the retransmission energy is adjusted so that the receiving energy of retransmitted packet will be 25% of the receiving energy for the initial transmission energy of the data to be retransmitted.

Therefore, energy corresponding to 19.2 kbps is allocated for the code symbol including the incremental redundancy code among the code symbols having the transmission speed of 153.6 kbps, and the rest energy is used for the newly transmitted code symbols.

In this case, the rest energy corresponds to 134.4 kbps, and such a data rate fails to exist in the previous data rate set. In order to settle such a problem, the transmission, sped of the newly transmitted code symbols is set up as 76.8 kbps and repetition of the code symbols is carried out so as to match the transmission speed of 134.4 kbps.

Accordingly, in order to generate code symbols having the transmission speed(ex. initial 76.8 kbps to 134.4 kbps) corresponding to the energy allocated to the newly transmitted data in Table 1 the code symbols having the energy amounting to R are repeated or the code symbols having the energy amounting to P are punctured. R(repetition energy) or P(puncturing energy) means that the corresponding code symbols are symbol-repeated or punctured in order to fill the transmission energy corresponding to the data rate determined by the reverse link dedicate data rate control.

There is another method of fragmenting the previous set of data rates by 9.6 kbps unit. Such a method is troublesome in determining the entire data rates corresponding to 1 to 107 from a view point of energy. Besides, having an advantage of increasing a filing efficiency in packet generation, such a method has a disadvantage of increasing a count of reverse rate indicators(hereinafter abbreviated RRI) designating a data rate of a reverse link.

Namely, 8 kinds of data rates of the reverse link are basically considered currently, thereby enabling to represent the data rate by RRI of 3 bits. Yet, RRI of 7 bits are required for designating 107 data rates from 1 to 107.

Significantly, a unit of minimum energy for retransmission considers 1, i.e. 9.6 kbps, as normalized energy.

Second, the CDM system is applied to an embodiment of the present invention.

It is considered to use two kinds of code channels, a reverse supplemental channel 1 and a reverse supplemental channel 2 in the reverse link of the current 1×-EV DV.

And, four kinds of data rates, {9.6 kbps, 19.2 kbps, 38.4 kbps, 76.8 kbps}, are considered for the reverse supplemental channel 2.

In the embodiment according to the present invention, the reverse supplemental channel 1 is always used as a physical channel for new transmission and the reverse supplemental channel 2 is always used as a physical channel for retransmission.

Figure 3:
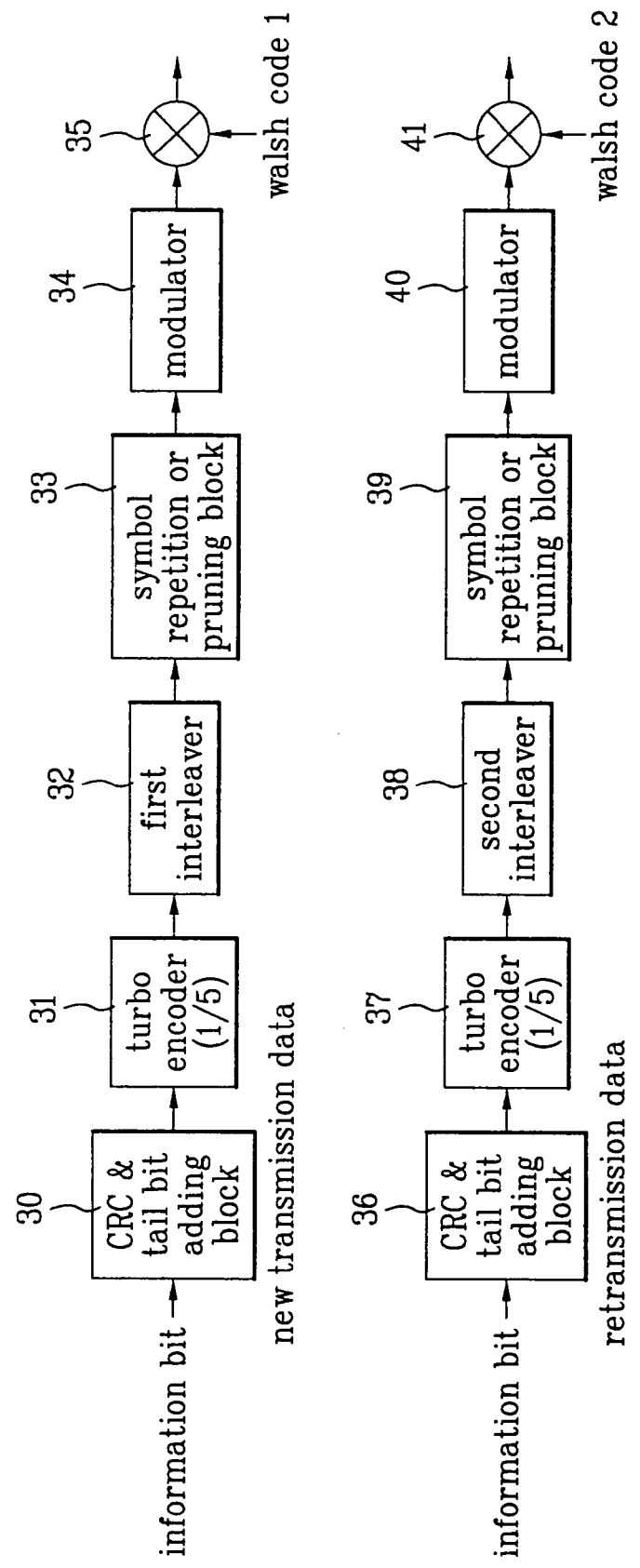
FIG. 3 illustrates a functional block diagram for generating a transmission signal using a CDM system according to the first embodiment of the present invention.

FIG. 3 illustrates a functional block diagram for generating a transmission signal using a CDM system according to the first embodiment of the present invention.

Referring to FIG. 3, a system of generating a transmission signal using CDM according to the present invention is constructed as follows. In order to generate code symbols including new information(newly transmitted data) and other code symbols including a redundancy code failing to be transmitted through a packet(data to be retransmitted) having received NAK in the previously transmitted signals from a receiving end, a transmission end for each channel includes CRC & tail bit adding blocks 30 and 36 adding CRC(cyclic redundancy code) for an error check to an information bit a receiving end wants to transmit, turbo encoders 31 and 37 encoding outputs of the blocks 30 and 36 into turbo codes of ⅕ code rate, first and second interleavers 31 and 38 rearranging orders of encoded code symbols to prevent a transmission error so as to divide the encoded code symbols into redundancy codes to be transmitted and redundancy codes not to be transmitted, respectively, symbol repetition or pruning blocks 33 and 39 generating a length of a predetermined code symbol stream corresponding to transmission energy allocated to the data to be newly transmitted and the other data to be retransmitted by symbol repetition or pruning of the rearranged code symbols, modulators 34 and 40 modulating the symbol-repeated or pruned code symbols, and spreaders 35 and 41 spreading the modulated code symbol stream using respective Walsh codes.

Therefore, the CRC & tail bit adding block 30 or 36 adds the CRC fox the error check and the tail bit to the information bit(data to be newly transmitted or be retransmitted) to be transmitted to the receiving end.

The turbo encoder 31 or 37 encodes the bit stream to which the CRC and tail bit are added into the turbo code having the ⅕ code rate.

The first or second interleaver 32 or 38 rearranges the order of the code symbols encoded into the turbo code. Namely, the interleavers 32 and 38 change a bust error into a random error as a channel interleaver of the related art as well as the order of the encoded symbols is properly adjusted so as to distinguish the redundancy code, which is to be contained in the data to be newly transmitted or fails to be transmitted to the previously transmitted data.

The symbol repetition or pruning block 33 or 39 symbol-repeats or prunes the rearranged code symbols as many as a predetermined count of symbols in order to meet a count of the encoded symbols with transmission energy allocated to the new transmission and the retransmission respectively.

Thereafter, the code symbols are modulated by the modulator 34 or 40, and then spread to the corresponding Walsh code by the spreader 35 or 41 so as to be transmitted to the receiving end through the reverse supplemental channel 1 and the reverse supplemental channel 2.

In this case, portions of the code symbols, which are retransmitted through the reverse supplemental channel 2, except the redundancy code having been used for the original transmission are manipulated to be transmitted, thereby enabling to reduce an effective code rate through code combining in the receiving end.

Namely, the reverse supplemental channel 2 is allocated to a physical channel for the retransmission to the packet from which NAK is generated, and then the Walsh code for this channel is allocated independently. Thus, a code multiplexing method using the allocated Walsh code may be considered.

Table 2 illustrates, when a count of retransmission is ted to 1, the normalized energy allocated to a code symbol the newly transmitted data or a code symbol including an incremental redundancy code for the data, to be retransmitted in a reverse link HARQ system using CDM, where 'channel 1' or 'channel 2' indicates one of the reverse supplemental channels.

TABLE 2

| R/eng. | 1 | | 2 | | 4 | | 8 | | 16 | | 32 | | 64 | | 107 | |
|---|---|---|---|---|---|---|---|---|---|---|---|---|---|---|---|---|
| I/eng. | Ch 2 | Ch 1 | Ch 2 | Ch 1 | Ch 2 | Ch 1 | Ch 2 | Ch 1 | Ch 2 | Ch 1 | Ch 2 | Ch 1 | Ch 2 | Ch 1 | Ch 2 | Ch 1 |
| 1 | 1 | 0 | 1 | 1 | 1 | 2 | 0.25 | 8 | 0.25 | 16 | 0.25 | 32 | 0.25 | 64 | 0.25 | 107 |
| 2 | 1 | 0 | 1 | 1 | 1 | 2 | 1 | 4 | 0.5 | 16 | 0.5 | 32 | 0.5 | 64 | 0.5 | 107 |
| 4 | 1 | 0 | 1 | 1 | 1 | 2 | 1 | 4 | 1 | 16 | 1 | 32 | 1 | 64 | 1 | 107 |
| 8 | 1 | 0 | 2 | 0 | 2 | 2 | 2 | 4 | 2 | 8 | 2 | 32 | 2 | 64 | 2 | 107 |
| 16 | 1 | 0 | 2 | 0 | 4 | 0 | 4 | 4 | 4 | 8 | 4 | 16 | 4 | 64 | 4 | 107 |
| 32 | 1 | 0 | 2 | 0 | 4 | 0 | 8 | 0 | 8 | 8 | 8 | 16 | 8 | 32 | 8 | 64 |
| 64 | 1 | 0 | 2 | 0 | 4 | 0 | 8 | 0 | 16 | 0 | 16 | 16 | 16 | 32 | 16 | 64 |
| 107 | 1 | 0 | 2 | 0 | 4 | 0 | 8 | 0 | 16 | 0 | 32 | 0 | 32 | 32 | 32 | 64 |

(R/eng.: retransmission energy, I/eng.: initial transmission energy)

Table has the same assumption of Table 1. Namely, This example 2 assumes that a transmission power level on retransmission is determined in a manner that only 25% of the receiving energy for the initial transmission energy of the corresponding retransmission data becomes the receiving energy on retransmission.

Moreover, a data rate set usable for the reverse supplemental channel 2 is {2.4 kbps, 4.8 kbps, 9.6 kbps, 19.2 kbps, 38.4 kbps, 76.8 kbps, 153.6 kbps, 307.2 kbps}.

In this case, if the energy corresponding to 9.6 kbps is normalized as 1, the energy usable for the data to be retransmitted is represented by {0.25, 0.5, 1, 2, 4, 8, 16, 32}. And, the energy for the newly transmitted data is the same case of the previous reverse supplemental channel 1, i.e. {1, 2, 4, 8, 16, 32, 64, 107}.

For instance, the data rate of the newly transmitted data is 38.4 kbps, an error occurs in the packet transmitted to the receiving end at this speed, and NAK for the corresponding packet is transmitted to the transmission end from the receiving end. Therefore, assuming that an allowable data rate by the reverse link dedicate rate control is 153.6 kbps at the time point of determining the retransmission, the transmission energy of 9.6 kbps is allocated to the code symbols for the data to be retransmitted on retransmission. In this case, the transmission energy of the retransmission is allocated so that 25% of the receiving energy for the initial transmission energy of the corresponding retransmission data becomes the receiving energy on the retransmission.

And, the remaining energy after the allocating for the code symbols including the incremental redundancy code is allocated to the code symbols for the newly transmitted data. In this case, the data rate for the code symbols of the newly transmitted data can be determined as 76.8 kbps or 153.6 kbps.

If the data rate of the reverse supplemental channel 1 is determined as 76.8 kbps, the energy allowed for the terminal to use fails to be used entirely. If it is transmitted at 153.6 kbps, energy about 10 og{(1+16)/16}=0.26 dB is further used than the entire energy allowed for the terminal to use.

Such an additional energy is allowable so that the terminal enables to select the data rate for the reverse supplemental channel 1.

Figure 4:
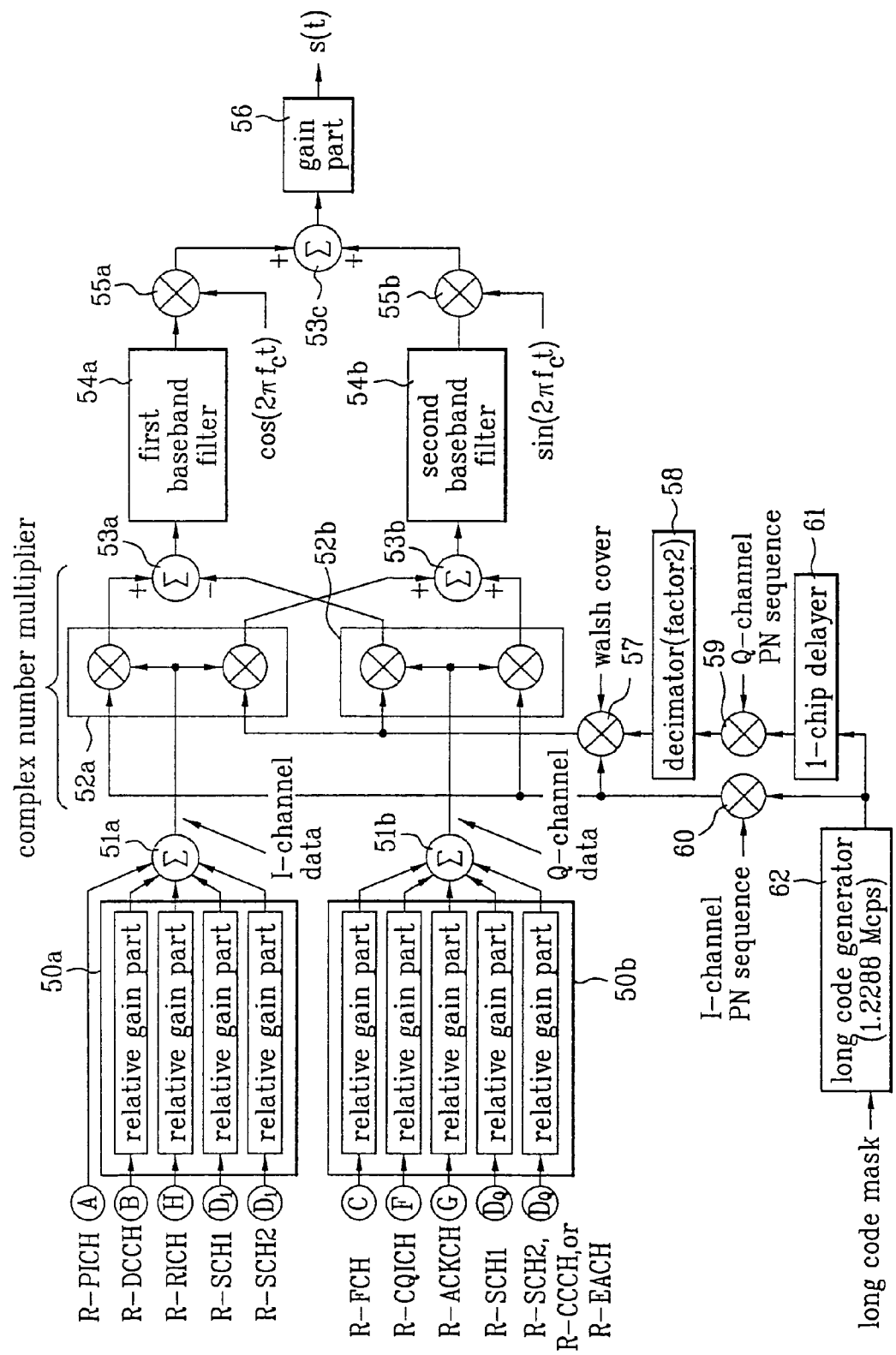
FIG. 4 illustrates a device block diagram of a process of generating a transmission signal using the CDM system according to the first embodiment of the present invention.

FIG. 4 illustrates a device block diagram of a process of generating a transmission signal using the CDM systems according to the first embodiment of the present invention.

Referring to FIG. 4, the reverse supplemental channels (hereinafter abbreviated R-SCH1 and R-SCH2) together with other channels R-PICH, R-DCCH, R-RICH, R-FCH, R-CQICH, and R-ACKCH are divided into I channel and Q channel respectively. Namely, the R-SCH1 and R-SCH2 together with the R-PICH, R-DCCH, and R-RICH are divided into the I channel, and the R-SCH1 and R-SCH2 together with the R-FCH, R-CQICH, and R-ACKCH are divided into the Q channel. When the R-SCH2 is not used, the R-CCCH or R-EACH is transmitted.

Therefore, the code symbols of the respective channels included in the I or Q channel are transferred to the respective relative gain parts 50a 50b so as to further include relative gains, and then synthesized as one code symbols for the I and Q channels by adders 51a and 51b, respectively. These synthesized code symbols are called I channel data and Q channel data.

The I or Q channel data is multiplied by a code resulted from multiplying an I channel sequence(60) by a long code generated from a long code generator 61 (one of the adders 52a and 52b).

A code, which is delayed by an one-chip delayer 61 from the generated long code is multiplied by a Q channel sequence (59), detected by a decimator 58 by ½ chip unit so as to be multiplied by a Walsh cover 57, and then multiplied by the I or Q channel data.(the other adder 52a or 52b.

The code symbols, which are generated from being multiplied by the I channel data, and the other code symbols, which are generated from being multiplied by the Q channel data, in the finally multiplied symbols are synthesized by each adder 53a or 53b, band-passed by a first or second baseband filter 54a or 54b, multiplied by a carrier wave cos2πfct or sin2πfct (55a, 55b) so as to be synthesized by an adder 53c, and, then transferred to a gain part 56 to include more gain so as to generate a final transmission signal S(t).

SECOND EMBODIMENT

A second embodiment according to the present invention, in applying HARQ to a reverse link, proposes a method of adjusting transmission energy on transmission, in which a packet receiving NACK from a receiving end due to poor receiving status should be received with a predetermined portion of energy less than the receiving energy for the initial transmission energy of the packet on retransmission.

And, the second embodiment according to the present invention proposes a method of optimizing a packet throughput of a reverse link using a spare energy space, which is provided by using such an energy reduction method on retransmission, for the transmission of a new packet.

Moreover, the second embodiment according to the present invention proposes a method of combining the energy reduction automatic retransmission technique with a data dedicate rate control technique for a reverse traffic.

Yet, the second embodiment according to the present invention proposes uses a technique of adjusting a traffic energy level of the packet to be retransmitted in a manner that a receiving energy level at a base transceiver system of the retransmitted packet should become a predetermined portion compared to the receiving energy level of an initial transmission packet of the packet to be retransmitted.

Assuming that the receiving energy level of a packet to be newly transmitted is 1, the receiving energy of the packet to be retransmitted is adjusted so as to be $\alpha(0<\alpha\leq 1)$. Resultingly, the base transceiver system enables to use energy amounting to $(1+\alpha)$ for a decoding process by combining the receiving energy of the packet to be newly transmitted with the receiving energy of the packet to be retransmitted. In this case, the fact that it is able to adjust the energy level of the packet to be retransmitted to an amount what we demand means that a pilot channel of the reverse link undergoes a reverse link energy control. Accordingly, the energy level of the reverse link pilot channel undergoes a power control by the base transceiver system so as to keep a constant level. And, energy gain values of other channels of the reverse link are adjusted so as to have a constant ratio to a transmission energy level of the pilot channel.

Therefore, assuming that a traffic to pilot power ratio(TP) of the newly transmitted packet is $G_{first}$, the method used by the present invention adjusts a traffic to pilot power ratio $G_{Ro-Tx}$ to be used for retransmitting the packet into $\alpha \cdot G_{first}$.

As a result of such adjustment, the receiving energy of the retransmitted packet received by the base transceiver system will be 100 $\alpha$% of the receiving energy of the initially transmitted packet of the retransmitted packet. A value of $\alpha$ is currently considered as one of 0.5, 0.25, and 0.125.

If $\alpha$ is 0.25, the transmission energy for the retransmission packet is adjusted so that the receiving energy of the retransmitted packet received by the base transceiver system becomes 25% of the receiving energy of the initially transmitted packet.

As mentioned in the foregoing description, if the technique of adjusting the transmission energy level of the energy on retransmission is taken, spare transmission energy is attained at the time point of the retransmission. The above-attained spare transmission energy is used for the transmission of a new packet, thereby enabling to increase a data throughput of the reverse link.

For such a purpose, the present invention uses a method of multiplexing the retransmission of the packet to which NACK is transmitted by the receiving end and the transmission of the new packet. In this case, CDM(code division multiplexing) and TDM(time division multiplexing) are considered for multiplexing the retransmission packet and new packet.

Therefore, The following channels are defined on the reverse link.

First, a channel for packet transmission of the reverse link is called a reverse packet data channel(R-PDCH). The R-PDCH is constructed with two kinds of sub-channels, R-NPDCH (reverse new packet data channel) used for transmitting a new packet and P-RPDCH (reverse retransmission packet data channel) for transmitting a retransmitted packet.

The two sub-channels are multiplexed using CDM or TDM.

First, when CDM is used, the R-NPDCH and R-RPDCH are transmitted on two physical channels independent reciprocally using different Walsh codes.

And, when TDM is used, the retransmission and the new transmission are multiplexed in due time on one physical channel using one Walsh code.

Figure 5:
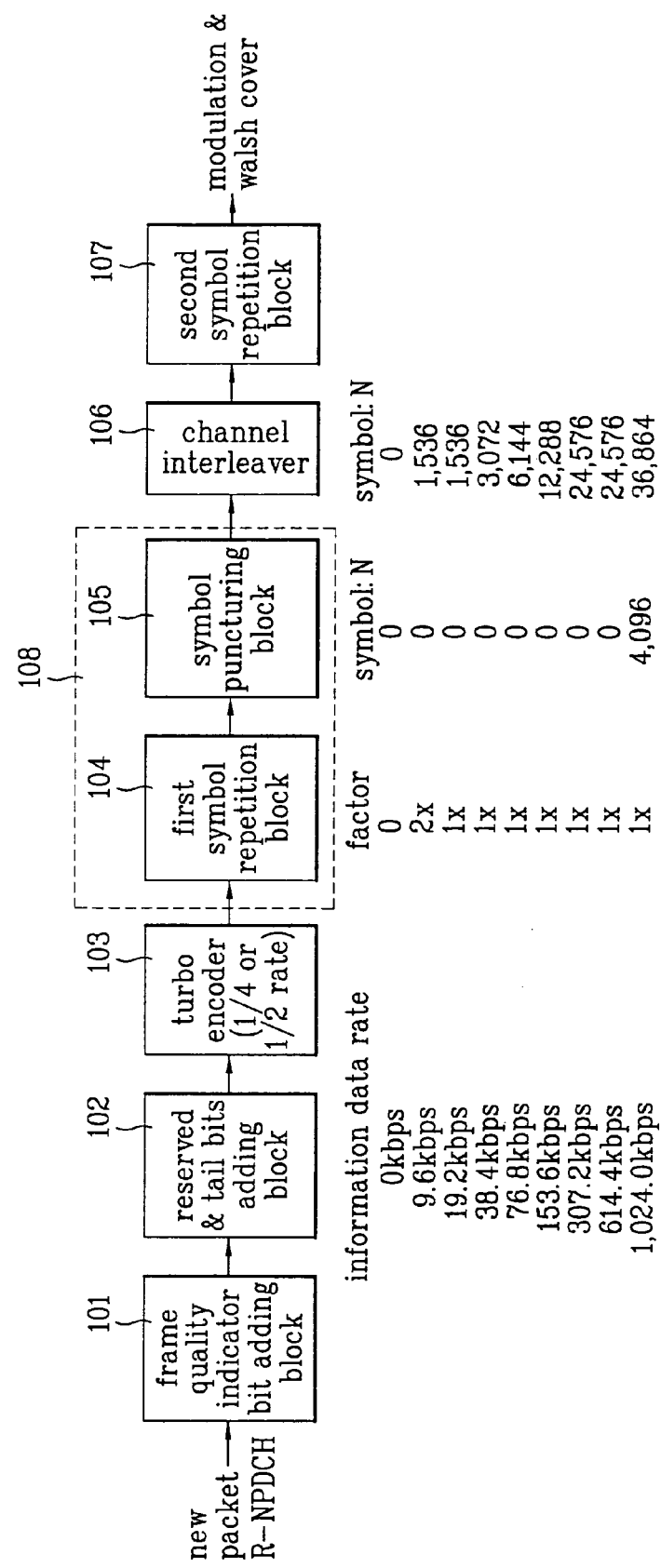
FIG. 5 illustrates a block diagram of an example for a transmission chain construction of R-NPDCH for an initially-transmitted packet according to a second embodiment of the present invention.
Figure 6:
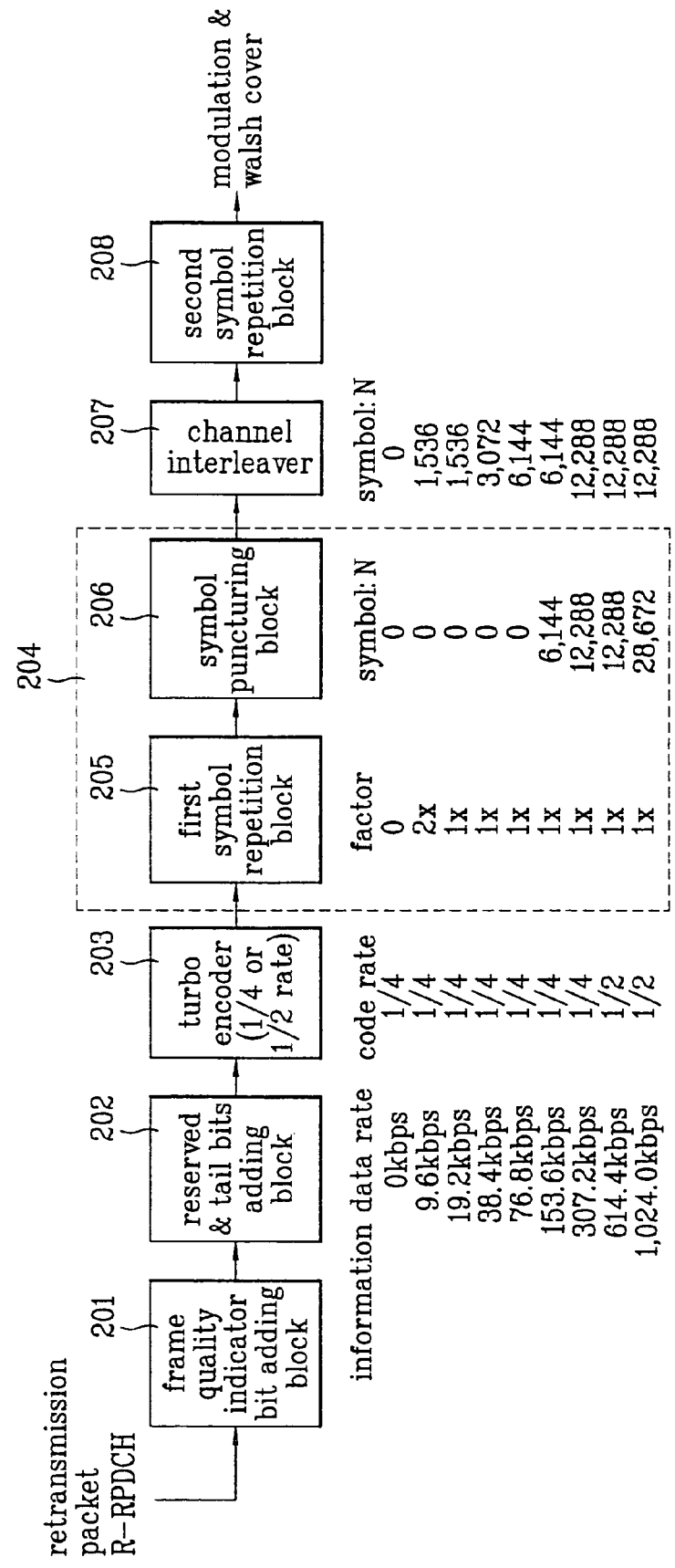
FIG. 6 illustrates a, block diagram of an example for a transmission chain construction of R-RPDCH for a retransmission packet according to the second, embodiment of the present invention.

FIG. 5 to FIG. 8 illustrate a transmission chain construction considering CDM. Specifically, FIG. 5 and FIG. 6 illustrate transmission chain constructions of the respective channels R-RPDCH and R-NPDCH considering a chase combining in the HARQ system.

FIG. 5 illustrates a block diagram of an example for a transmission chain construction of R-NPDCH for a newly transmitted packet according to a, second embodiment of the present invention.

FIG. 6 illustrates a block diagram of an example for a transmission chain construction of R-RPDCH for the retransmitted packet transmission according to the second embodiment of the present invention.

Referring to FIG. 5 and FIG. 6, the R-NPDCH and R-RPDCH construct transmission chains including frame quality indicator bit adding blocks 101 and 201, reserved & tail bit adding blocks 101 and 202, turbo encoders(¼ and ½ rates) 103 and 203, first symbol repetition blocks 104 and, 205, symbol puncturing blocks 105 and 206, channel interleavers 106 and 207, and second symbol repetition blocks 107 and, 208, respectively.

The first symbol repetition block/symbol puncturing block 104/105 and the first symbol repetition block/symbol puncturing block 205/206 construct rate matching blocks 108 and 204, respectively.

First of all, a frame quality indicator bit or 16 bits is added to a packet data transmitted from the upper. And, a tail bit and a reserved bit are added thereto. Then, the packet data undergoes a turbo encoding process.

After the encoding process, a rate matching process with a length of a channel interleaver to be used is carried out through symbol repetition and symbol puncturing processes.

Each of the second symbol repletion blocks 107 and 208 should carry out a number of the repetition as much as a proper quantity according to a length of a Walsh code to be used in a modulation block(not shown in the drawing) and a Walsh cover block (not shown in the drawing) at a rear end.

Such a construction is based on the assumption of the chase combining of type I in the combining process of the HARQ system.

At the lower part of the respective blocks in FIG. 5, provided are data transfer rates(0, 9.6 kbps, 19.2 kbps, 38.4 kbps, 76.8 kbps, 153.6 kbps, 307.2 kbps, 614.4 kbps, 1024 kbps) of R-NPDCH in case of using the chase combining or partial chase combining, effective code rates(½ or ¼), repetition factors(2×, 1×, 0) of symbol, puncturing quantity(0, 4096) of symbol, lengths(1536, 1536, 3072, 6144, 12288, 24576, 24576, 36864) of the used channel interleaver, and the like.

At the lower part of the respective blocks in FIG. 6, provided are data transfer rates(0, 9.6 kbps, 19.2 kbps, 38.4 kbps, 76.8 kbps, 153.6 kbps,307.2 kbps, 614.4 kbps, 1024 kbps) of R-RPDCH in case of using the chase combining or partial chase combining, effective code rates(½ or ¼), repetition factors(2×, 1×, 0) of symbol, puncturing quantity(0, 6144, 12288, 12288, 28672) of symbol, lengths(1536, 1536, 3072, 6144, 6144, 12288, 12288, 12288, 12288) of the used channel interleaver, and the like.

The data rate of the data to be retransmitted for the R-RPDCH has the same information data rate of the R-NPDCH used for the initially transmitted data of the data to be retransmitted.

Namely, assuming that the data rate having been used for the newly transmitted packet was 38.4 kbps and that NACK is transmitted from the receiving end due to an error occurring at the packets the transmission chain corresponding to 38.4 kbps of the R-RPDCH is used on retransmission.

Moreover, in the transmission chain of the R-RPDCH, the code rate of the turbo encoder 203 is the same of the R-NPDCH in FIG. 5.

Yet, it is limited in the diffusion process that a minimum diffusion factors available for the R-NPDCH and the R-NPDCH are 2 and 4, respectively. Accordingly, an effective code rate from a specific data rate is changed after passing the symbol puncturing block 206.

Namely, the chase combining is carried out on the transmission data rates to 76.8 kbps with the turbo code of ¼ code, but portions of the encoded code symbols are retransmitted for the data rates higher that 76.8 kbps(i.e. 153.6 kbps~1034 kbps). Therefore, the partial combining is carried out.

Figure 7:
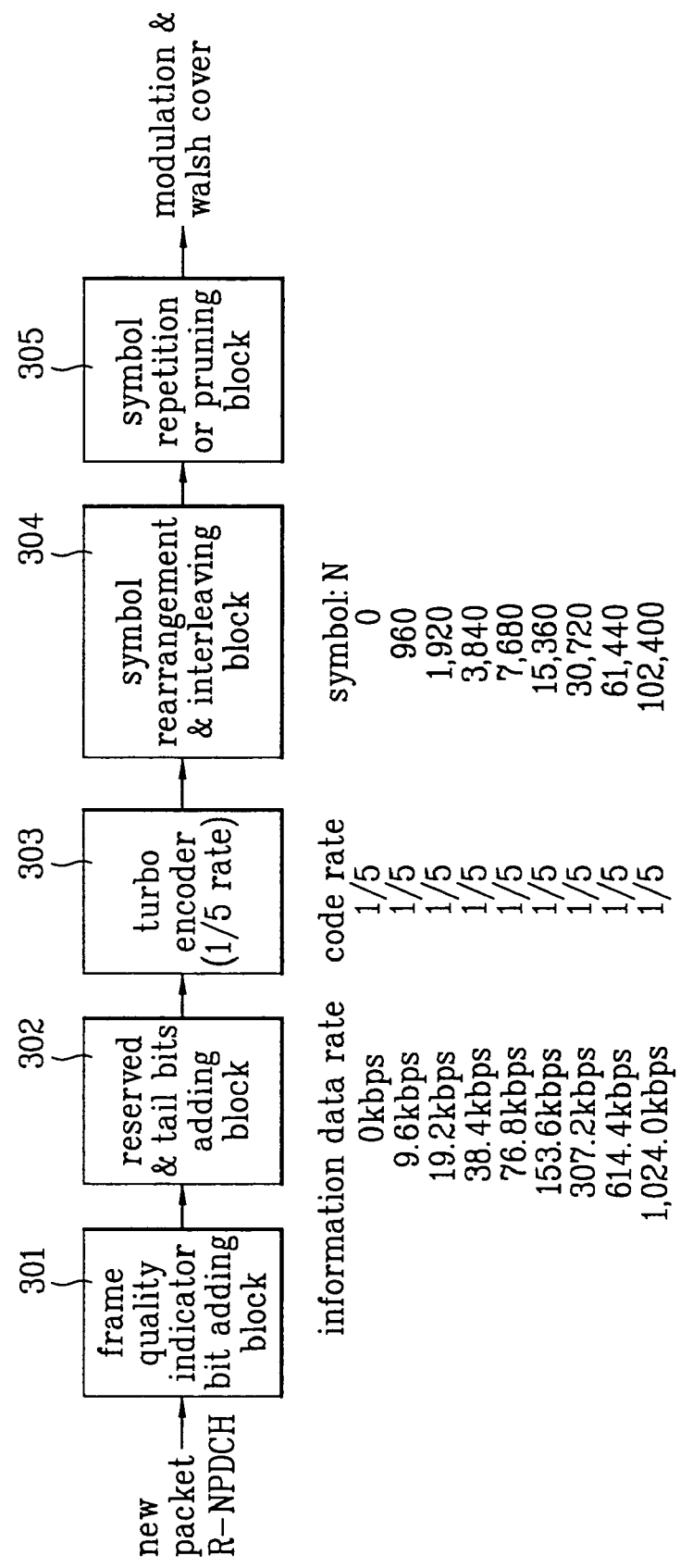
FIG. 7 illustrates a block diagram of another example for a transmission chain construction of R-NPDCH for an initially-transmitted packet according to the second embodiment of the present invention.
Figure 8:
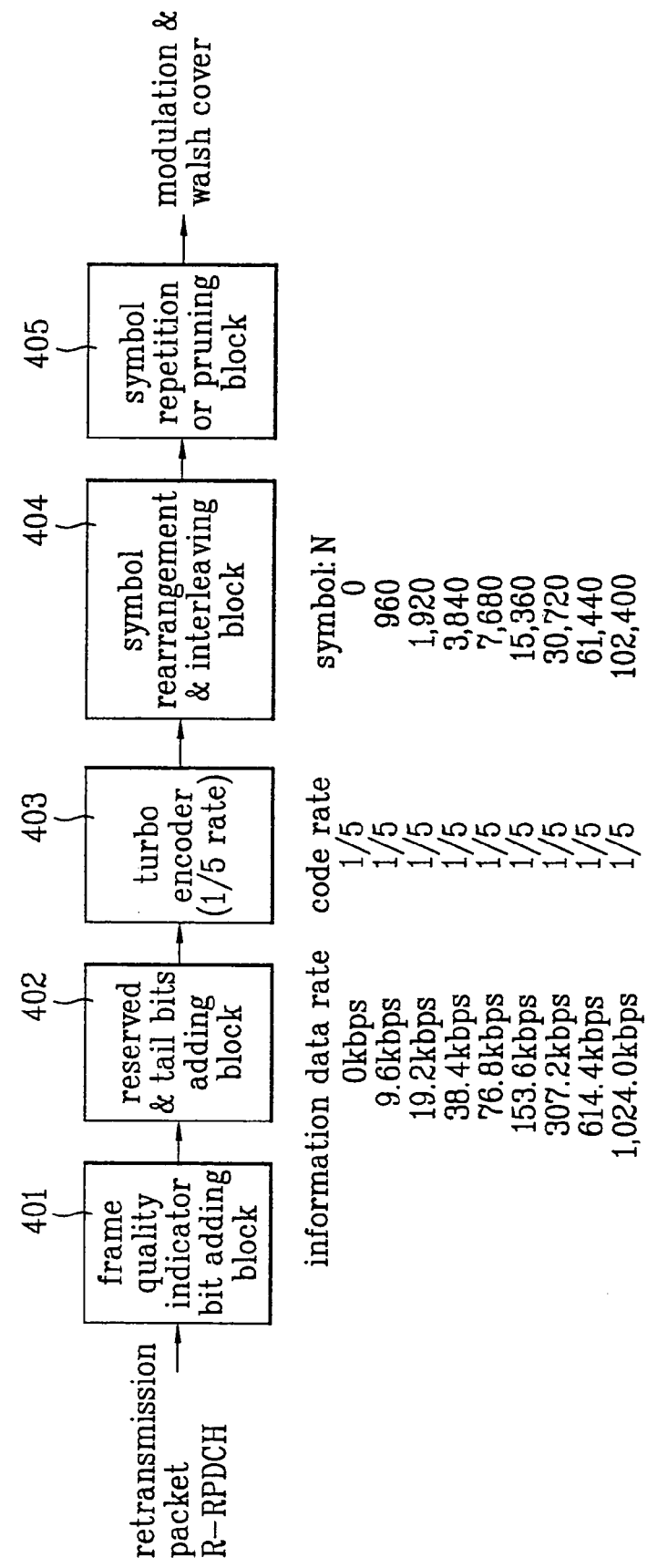
FIG. 8 illustrates a block diagram of another example for a transmission chain construction of R-RPDCH for a retransmission packet according to the second embodiment of the present invention.

If the incremental redundancy transmission process is considered, another transmission chain of R-NPDCH or R-RPDCH in FIG. 7 or FIG. 8 should be taken into consideration.

FIG. 7 illustrates a block diagram of another example of a transmission chain construction of R-NPDCH for a newly transmitted packet according to the second embodiment of the present invention.

FIG. 8 illustrates a block diagram of another example of a transmission chain construction of R-RPDCH for a retransmitted packet transmission according to the second embodiment of the present invention.

Referring to FIG. 7 and FIG. 8, the R-NPDCH and R-RPDCH construct transmission chains including frame quality indicator bit adding blocks 301 and 401, reserved & tail bit adding blocks 302 and 402, turbo encoders(⅕ rate) 303 and 403, symbol rearrangement & interleaving blocks 304 and 404, and symbol pruning or repetition blocks 305 and 405, respectively.

First of all, a frame quality indicator bit of 16 bits is added to a packet data transmitted from the upper by the frame quality indicator bit adding block 301 or 401. And, a tail bit and a reserved bit are added thereto by the reserved & tail bit adding block 302 or 402. Then, the packet data undergoes a turbo encoding process by the turbo encoder 303 or 403.

After the encoding process, a redundancy code, which is included in the packet to be newly transmitted so as to be transmitted, or a, redundancy code(which has failed to be included in the previous transmission signal), which is included in the other packet to be retransmitted so as to be transmitted, is divided into by the symbol rearrangement & interleaving block 304 or 404, and an order of the symbols is properly adjusted so as to prevent as bust transmission error. Such an operation of symbol rearrangement & interleaving enables the next step of symbol repetition or pruning to be carried out with ease.

Each of the symbol pruning & repletion blocks 305 and 405 carries out a number of the pruning or repetition as many as a count of the predetermined symbols of which order is rearranged so as to meet the count of the encoded symbols allocated to the newly transmitted or retransmitted packet.

In FIG. 7 and. FIG. 8, when the incremental redundancy combining process is considered the R-NPDCH or R-RPDCH always uses the turbo encoder 303 or 403 of ⅕ code rate. Moreover, the symbol rearrangement & interleaving blocks 304 and 404 should be designed so as to carry out both roles of rearrangement(re-ordering) and channel interleavers of the code symbols for the incremental redundancy process.

At the lower parts in FIG. 7 and FIG. 8, provided are code rates of the turbo encoders 303 and. 403 and interleaving lengths in accordance with the data transfer rates of the R-NPDCH and R-RPDCH.

In, FIG. 8, the symbol rearrangement & interleaving block 404 of the R-RPDCH should follow the same interleaving regulation of the other symbol rearrangement & interleaving block 304 of the R-NPDCH.

Resultantly, the orders of the rearranged symbols of the R-NPDCH and R-RPDCH after the interleaving are identical to each other. In this case, the code symbols, which will be transmitted in the R-RPDCH, are transmitted in a manner of a wrap round system from the code symbol following the last code symbol having been transmitted form the R-NPDCH. Through such a system, the base transceiver system enables to make the minimum effective code rate when the packets to be newly transmitted and to be retransmitted are combined with each other.

FIG. 9 illustrates diagrams of multiplexed R-NPDCH for an initial transmission and R-PDCH for a retransmission according to the second embodiment of the present invention.

Referring to FIG. 9, when a packet transmitted initially at an $j_{th}$ packet time is transmitted to R-NPDCH using a transmission rate of R, let's assume that a base transceiver system transmits a NACK command to a terminal since an error occurs at the initially transmitted packet.

In this case, for convenience, it is assumed that the terminal carries out the retransmission of the packet having NACK just at the moment of transmitting an $(i+D)_{th}$ packet, where it is assumed that D is a delay time(packet unit) of HARQ.

The terminal having received NAK knows an initial transmission data rate R of the data to be retransmitted, whereby the data rate R-RPDCH will use for the retransmission of the initially transmitted data is a value having been already determined, R.

As mentioned in the foregoing description, the transmission power of the R-RPDCH is controlled so that the base transceiver system enables to receive a portion of the receiving energy for the initial transmission energy of the data to be retransmitted. If the T/P ratio of the R-NPDCH for the initially transmitted data of the data to be retransmitted is $G_{first}$, a T/P ratio of the R-RPDCH at the time point of the retransmission is determined as $\alpha \cdot G_{first}$.

Therefore, on retransmission, the R-RPDCH will use a transmission chain corresponding to the transmission rate of R in FIG. 6 or FIG. 9 and the T/P ratio of $\alpha \cdot G_{first}$.

FIG. 2 is a diagram assuming that D is 2. Namely, when the base transceiver system transmits NACK to the terminal for a packet-1 of the R-NPDCH, the terminal carries out the retransmission, for the packet-I having the NACK through the R-RPDCH at the transmission time point of a packet-3. In this case, the transmission speed of the packet-3 of the R-RPDCH becomes the same of the packet-1 of the R-NPDCH, and the T/P ratio is determined as $\alpha \cdot G_{first}$. Besides, the data transmission rate of the R-NPDCH is determined by the following process in accordance with the transmission energy which is allowed to the terminal to transmit at the retransmission time point.

From now on, let us consider the case that the base transceiver system controls the traffic transmission data rate of each terminal.

The base transceiver system maintains the reverse traffic transmission data rate of the terminal, or commands an RRC bit(which indicates increment or decrement) to the terminal through F-CRCCH (forward common rate control channel The terminal having received such a command checks the RRC bit so as to determine the combining data rate to be transmitted in accordance with a command of the base transceiver system. The transmission power the terminal will use will be determined in accordance with the combining data rate. Such a combining data rate will be called an effective data rate $R_{eff}$.

Substantially, the reverse link dedicate rate control carried out by the base transceiver system is to adjust the quantity of total power of the terminal which is received by the base transceiver system. In this case, let us assume that the base transceiver system has a spare amounting to $\alpha$ and generates the RRC bit which will be transmitted to each terminal. Namely, on the assumption that the energy received from the terminal may be maximum $(1+\alpha)$ times bigger, the base transceiver system generates the ARC bit.

How to carry out the multiplexing of the R-NPDCH and R-RPDCH according to each data rate control information is explained as follows.

First, let us assume that the data rate was R on the initial transmission for the R-RPDCH and that the terminal has kept on receiving the command that the terminal should maintain the data rate for the HARQ delay time(packet unit) of D from the base transceiver system.

Therefore, the terminal should use the transmission power corresponding to the effective rate of R. Yet, since the spare amounting to $\alpha$ has been considered when the RRC was generated in the base transceiver system the station, the terminal uses R as the data rate of the R-NPDCH to currently transmit and the R-RPDCH multiplexes the two channels with the data rate of R and the transmission power of $\alpha \cdot G_{first}$.

Resultingly, the terminal can use the energy as much maximum as 10 1og$(1+\alpha)$dB additionally. If $\alpha$ is 0.25, the terminal can use the power of about 0.97 dB, which is bigger than the power allowed by the base transceiver system, to the utmost additionally. If $\alpha$ is 0.5, the terminal can use the power of about 1.7 dB, which is bigger than the power allowed by the base transceiver system to the utmost additionally.

However, since the data rate of R is determined with the spare between 0.97 dB and 1.7 dB from a view point of the base transceiver system, the accompanied deterioration of the performance is negligible.

Second, let us assume that the effective data rate at the retransmission time point increases so as to be twice faster than the initial transmission data rate of a predetermined packet after the delay time D of HARQ from the initial transmission of the predetermined packet.

And, let us assume that the data rate of the R-NPDCH was R on the initial transmission for the packet. In this case, the R-RPDCH for the retransmission of the packet at the retransmission time point will use the data rate of D and the T/P of $\alpha \cdot G_{first}$.

And, in case that the terminal is not caught by the maximum energy limit or that there exists sufficient quantity of data to be transmitted, it is assumed that the terminal increases the transmission data rate of the currently transmitted R-NPDCH according to the command of the RRC bit.

For convenience, it is assumed that the increased transmission data, rate of the R-NPDCH is 2R. The fact that the base transceiver system transmits the command of increasing the data rate means that the T/P ratio the terminal enables to transmit should be made twice bigger than the current value.

In this case, the terminal can use the energy as much maximum as 10 1og$(1+\alpha/2)$dB additionally. If $\alpha$ is 0.25, the terminal can use the power of about 0.51 dB, which is bigger than the power allowed by the base transceiver system, to the utmost additionally. If $\alpha$ is 0.5, the terminal can use the power of about maximum 0.97 dB, which is bigger than the power allowed by the base transceiver system, to the utmost additionally.

However, since the base transceiver system already has the spare 0.97 dB($\alpha$=0.25) or 1.7 dB($\alpha$=0.5) when the RRC bit was generated, the accompanied deterioration of the performance is negligible.

Third, let us consider that the terminal receives the command of reducing the data rate so as to be lower than that of the initial transmission of the packet at the retransmission time point after the delay time D of HARQ from the initial transmission time point of the predetermined packet.

And, let us assume that the data rate of the R-NPDCH was R for the initial transmission for the packet. The power allowed to the terminal to use at the retransmission time point is ½ of the power used for the initial transmission of the packet. Hence, the terminal carries out the retransmission through the R-RPDCH for the retransmission of the packet using the T/P value of $0.5*G_{first}$.

In this case, the transmission of the R-NPDCH for the data to be newly transmitted is not carried out. If the terminal receives the command of reducing the data rate down to ¼ of the value of the initial transmission of the packet at the retransmission time point after the delay time D of the HARQ, the terminal carries out just the transmission of the packet using the $\alpha$ value of 0.25.

Figure 10A:
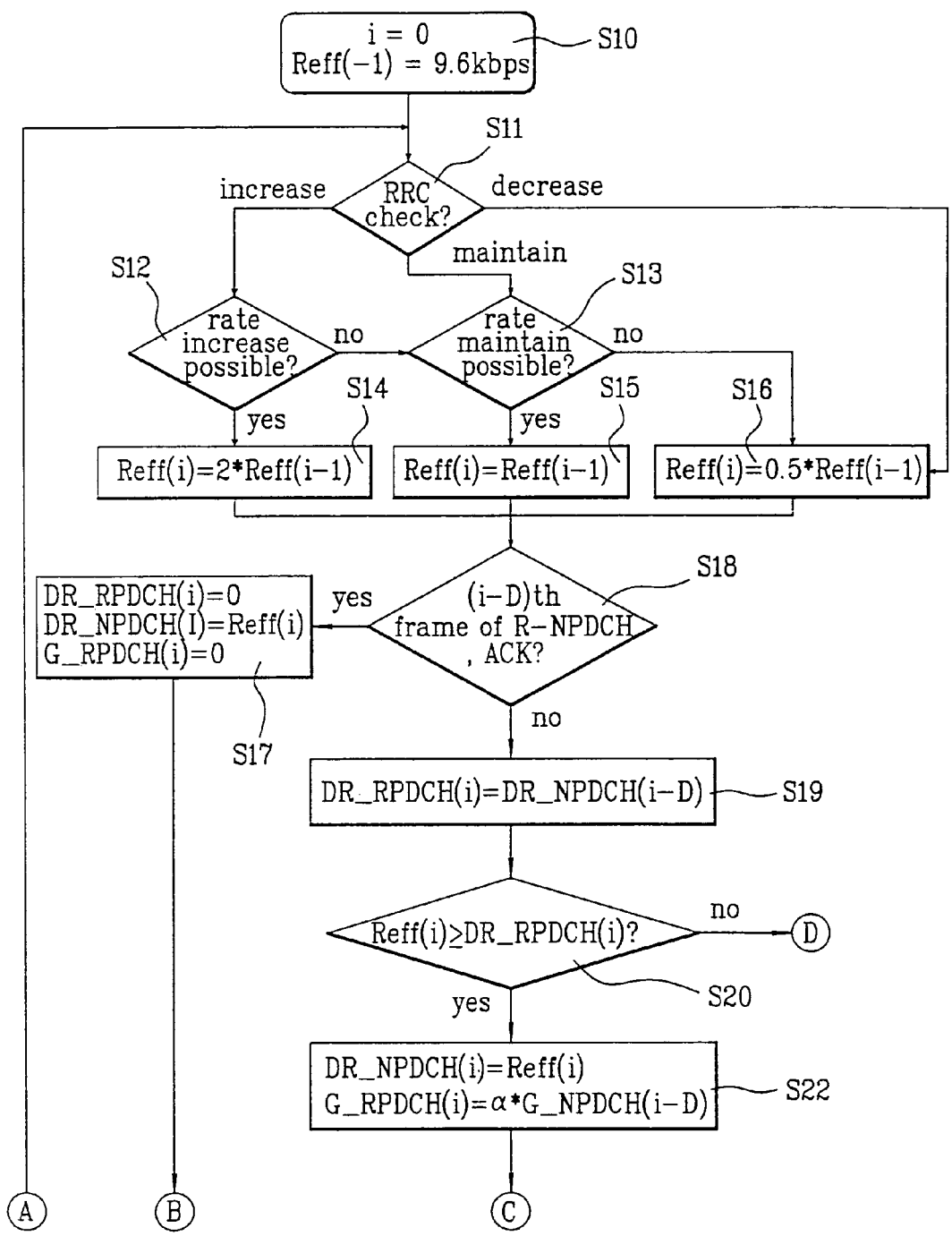
FIG. 10A and FIG. 10B illustrate flowcharts of examples for the systems of a reverse link traffic transmission data rate control of a base transceiver system and an energy reduction reverse link automatic retransmission according to the second embodiment of the present invention.
Figure 10B:
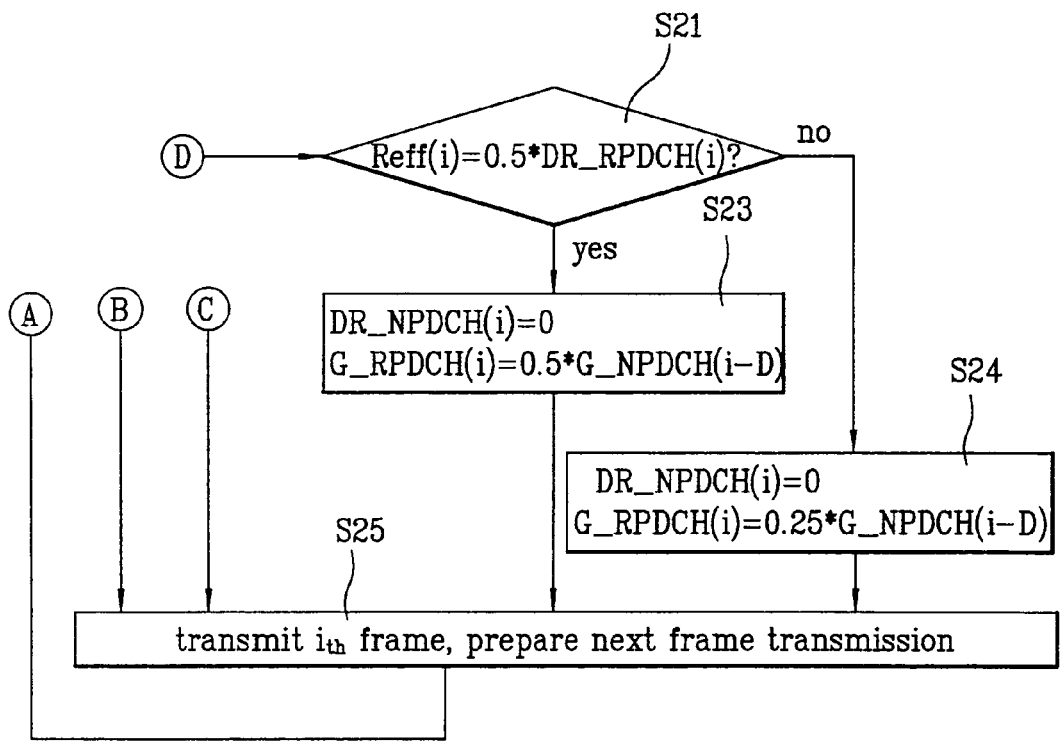

The algorithm of the combination of the HARQ system and the dedicate data rate control system can be expressed through the flowcharts like FIG. 10A and FIG. 10B.

FIG. 10A and FIG. 10B illustrate flowcharts of examples for the systems of a reverse traffic transmission data rate control of a base transceiver system and an energy control according to the second embodiment of the present invention.

Referring to FIG. 10A and FIG. 10b, the terminal, if having data to transmit, always starts transmitting the data at the transmission speed of 9.6 kbps without the approval of the base transceiver system. Hence, $R_{eff}(-1)$ is defined as 9.6 kbps in FIG. 10A and. FIG. 10B. And, from the packet time I=0, the terminal undergoes a data transmission speed dedicate control from the base transceiver system (S10).

At a time point of transmitting an $i_{th}$ packet, the terminal receives the RRC bit(reverse rate control) generated from the base transceiver system so as to determine an effective data transmission speed $R_{eff}(i)$ according to the RRC bit(S11).

Even if the terminal receives a command of increasing the transmission speed from the base transceiver system through the RRC bit, the terminal enables to maintain or reduce the effective data transmission speed in accordance with its status (S12 or S13).

Likewise, receiving a command of maintaining the transmission speed from the base transceiver system, the terminal enables to reduce the effective data transmission speed in accordance with its status.

Yet, receiving a command of receiving the transmission speed from the base transceiver system, the terminal always has to reduce the effective data transmission speed. In this case, the base transceiver system does not transmit the command of reducing the data transmission speed to the terminal of using the effective data transmission speed of 9.6 kbps.

Accordingly, the terminal updates the effective transmission speed $R_{eff}(i)$ in accordance with its status and the reverse link dedicate data transmission control (S14, S15, or S16). For instance, the corresponding terminal increases the data transmission speed twice higher than $R_{eff}(i-1)$ and decrease the data transmission speed ½ less than $R_{eff}(i-1)$ (S16).

Subsequently, the terminal checks whether ACK/NACK for an $(i-D)_{th}$ R-NPDCH packet is transmitted from the bas station(S18).

If ACK is transmitted from the base transceiver system, the terminal transmits R-NPDCH only for the data to be currently transmitted at the time point of transmitting the $i_{th}$ packet. In this cases there is no transmission of data in the R-RPDCH. Therefore, the data transmission speed of R-NPDCH for the data to be currently transmitted becomes $R_{eff}(i)$. Thus, DR_RPDCH (i) as a data, rate of the R-RPDCH is 0 at the time point of transmitting the $i_{th}$ packet, and DR_NPDCH(i) as a data rate of R-NPDCH for the data to be currently transmitted at the time point of the $i_{th}$ packet uses the previous $R_{eff}(i)$ Moreover, G_RPDCH(i) as a T/P ratio of R-NPDCH for the data to be currently transmitted becomes 0 at the time point of transmitting the $i_{th}$ packet (S17). Therefore, the terminal transmits the R-NPDCH and prepares a transmission of the next packet(S25).

When the terminal receives a NACK command for the $(i-D)_{th}$ R-NPDCH packet(S18), the DR_RPDCH(i) is updated as a value of the DR_NPDCH(i-D) (S19). And, the terminal compares the updated effective data transmission speed $R_{eff}(i)$ to the DR_NPDCH(i-D) of the transmission speed of R_NPDCH at the time point of transmitting the $(i-D)_{th}$ packet(S20).

If the $R_{eef}(i)$ value is equal to or bigger than the DR_NPDCH(i-D) of the transmission speed of R_NPDCH at the time point of transmitting the $(i-D)_{th}$ packet, the DR_NPDCH(i) of the transmission speed of the R_NPDCH to be transmitted at the time point of transmitting the $i_{th}$ packet is set up as $R_{eff}(i)$ (S22). And, the transmission speed of the R-RPDCH is the value previously determined as a speed transmitted in the $(i-D)_{th}$ R-NPDCH packet.

In this case, the terminal transmits a new packet using the R-NPDCH transmission chain corresponding to the determined transmission speed in FIG. 5 or FIG. 7.

Likewise, for the retransmission packet, used is the transmission chain of R-RPDCH in FIG. 6 or FIG. 8 corresponding to the data transmission speed in the $(i-D)_{th}$ R-NPDCH packet. In this case, as mentioned in the foregoing description, the transmission power of the R-RPDCH is adjusted so that the receiving energy of the retransmission packet received by the base transceiver system becomes a times to the initial receiving energy of the corresponding data to be retransmitted. For this, $\alpha \square$G_NPDCH (i-D) is used as the T/P (traffic to pilot power) ratio of the R-RPDCH, G_RPDCH(i) (S22).

If the $R_{eff}(i)$ value is ½ of the DR_RPDCH(i), which is the transmission speed of the R-NPDCH transmitted at the time point of transmitting the $(i-D)_{th}$ packet, or smaller than the DR_RPDCH H(i) (S21), the DR_NPDCH (i) which is the transmission data rate of the R-NPDCH to be transmitted at the time point of transmitting the $i_{th}$ packet is set up as 0(S23 or S24).

In this case, it may be the circumstance(status) that there is no power sufficient for the transmission of new packet, all available power is used for the retransmission packet. Namely, used is the transmission chain of R-RPDCH in FIG. 6 or FIG. 8 corresponding to the data transmission rate in the (i-D)th R-NPDCH packet. And, the transmission power of R-RPDCH is adjusted so as to use all available power at the very time point.

The above process is described in the following example.

First, it is assumed that an initial transmission data rate for a packet is 76.8 kbps and that a delay time of HARQ is a delay time of 3 packets. In this case, after the initial transmission of the packet, it is also assumed that the terminal has received RRC bits of (down, down, up) from the base transceiver system for the delay time of the three packets. And, $\alpha$ is assumed to be 0.25.

If the terminal receives NACK for the initially transmitted packet, an effective data transmission rate available for the terminal to use becomes 38.4 kbps at a time point of retransmission. The effective transmission data rate is ½ of the transmission data rate of the initially transmitted packet, whereby there occurs no transmission of a packet to be newly transmitted at the time point of retransmission{R_NPDCH (i)=0}. And, a transmission data rate of R-RPDCH becomes the data rate of the initially transmitted packet, 75.8 kbps. Moreover, transmission energy to be used for retransmission of packet will the entire energy allowed by the effective data rate determined at the time point of retransmission. Hence, a T/P ratio of R-RPDCH becomes ½ of the T/P ratio used in the initial transmission of the packet(G_RPDCH(i)=0.5G_NPDCH(i-D)).

For another example, it is assumed that RRC bits (up, up, down) are received from the base transceiver system for a delay time of 3 packets after initial transmission of the packet.

If the terminal receives NACK for the initially transmitted packet, an effective data transmission rate available for the terminal to use becomes 153.6 kbps at a time point of retransmission. The effective transmission data rate is bigger than the initial transmission data rate of the packet, whereby the transmission of the newly transmitted current packet and the transmission of the retransmitted packet at the time point of retransmission are time-multiplexed or code-multiplexed.

In this case, the transmission data rate of the newly transmitted packet becomes the effective transmission data rate, 153.6 kbps. In this case, the transmission data rate of R-RPDCH for the retransmission packet will be 76.8 kbps and a T/P ratio will be 0.25 times of the T/P ratio having been used in the initial transmission, of the packet to be retransmitted.

As mentioned in the foregoing description, if an energy reduction factor α is 0.5, when the method of multiplexing P-NPDCH and R-RPDCH using the flowcharts in FIG. 10A and FIG. 10B are used, there may be a slight chance to bring about a problem in the data rate control.

Figure 11A:
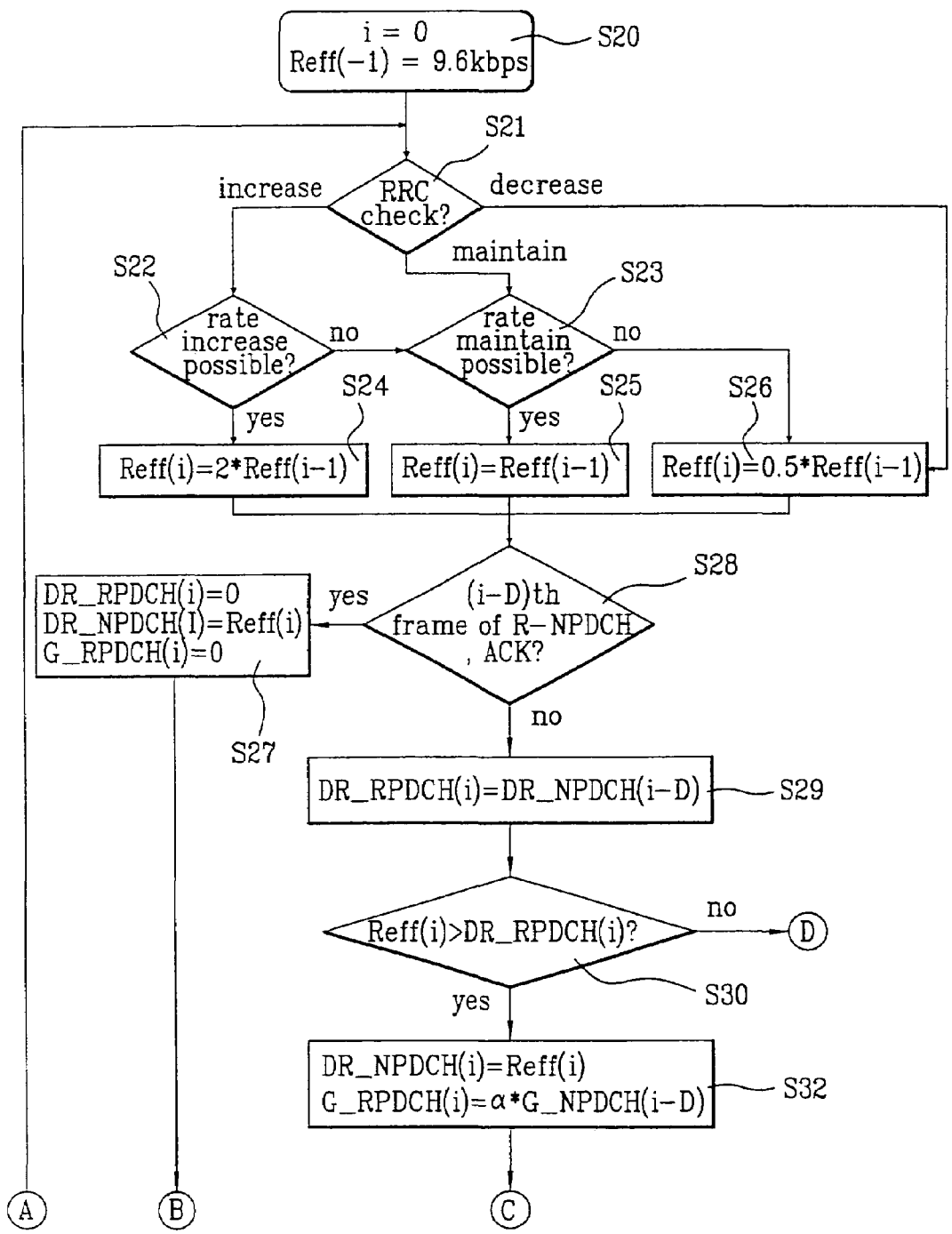
FIG. 11A and, FIG. 11B illustrate flowcharts of another examples for the systems of a reverse link traffic transmission data rate control of a base transceiver system and an energy reduction reverse link automatic retransmission.
Figure 11B:
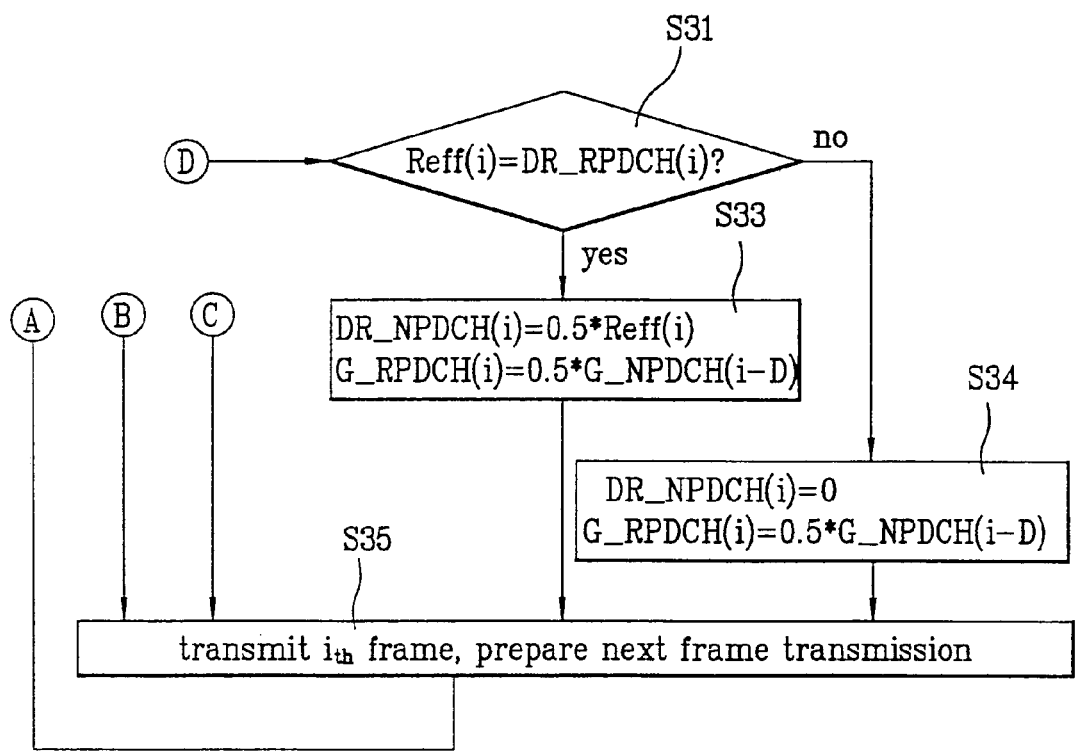

Let us assume, as explained in the foregoing description, that the initial transmission data rate of the packet was R and that the effective data rate determined by the data rate control is R at the time pint of retransmission. When the methods in FIG. 10A and FIG. 10B are used, the terminal comes into use of surplus energy, which is maximum 10 1 og(1+0.5)=1.7 dB bigger than the energy allowed to the terminal itself, additionally. Considering a margin of 1.7 dB when the base transceiver system generates RRC(reverse rate control) information, the multiplexing method in FIG. 10A and FIG. 10B has no other problem. Yet, such a relatively big margin may have difficulty in precision of the reverse data rate control. In such a case, the flowcharts in FIG. 11A and FIG. 13B may be used instead of using the flowcharts in FIG. 10A and FIG. 10B. FIG. 11A and FIG. 11B illustrate flowcharts of another examples for the systems of a reverse traffic transmission data rate control of a base transceiver system and an energy reduction reverse link automatic retransmission, in which the energy reduction factor α is 0.5.

Comparing FIG. 10A/FIG. 10B to FIG. 11A/FIG. 11B, when an initial transmission data rate for a packet is R and an effective data rate determined at a time point of retransmission is R, a data rate of R-NPDCH for a packet to be newly transmitted currently is set up as an effective data rate $R_{ef}(i)$ in FIG. 10A and FIG. 10B. Yet, the data rate of R-NPDCH for the packet to be newly transmitted currently is set up as ½ of the effective data rate $R_{ef}(i)$ on a step S33 in FIG. 11A and FIG. 11B.

It is noteworthy that there are two kinds of methods when the effective data, rate $R_{ef}(i)$ is 9600 bps. There exists no half of 9600 bps which is the lowest data rate. Hence, one method is to use 9600 bps as the transmission data rate of R-NPDCH, and the other is to transmit no data to R-NPDCH. In the former method, it is assumed that the additional available energy of 1.7 dB, which is relatively small, is allowable.

Second, the energy and data rate controls using the TDM system are carried out a s follows.

When there is a data rate determined in accordance with the reverse dedicate rate control, in order to construct code symbols enabling to fill the length of an interleaving block for the data rate, code symbols for new transmission and retransmission are separated for time-multiplexing, modulation, and diffusion so as to be transmitted.

In such a system, packets for retransmission and new transmission are transmitted through one physical channel using one Walsh codes The TDM system can be realized in accordance with the construction in FIG. 1.

First of all, it has to be considered where ACK and NAK commands are managed in order to apply a reverse HARQ system to a management method of the ACK and NAK commands.

Namely, it should be firstly taken into consideration that the ACK and NAK commands are managed by either a base transceiver system(hereinafter abbreviated BTS) or a base station controller (hereinafter abbreviated BSC).

If BSC controls ACK and NAK, all BTSs in an active set comes into transmission of the demodulated packets to ESC. Therefore, BSC generates an ACK signal if there exists at least one good packet or a NAK signal if all the packets transmitted from BTS are bad, so as to transmit such signals to all BTSs in the active set.

Then, all BTSs begin to transmit the same ACK or NAK signals to a terminal. If such a system is used, the terminal enables to carry out a soft combining on the ACK and NAK signals so as to increase the reliance for the ACK and NAK signals. Unfortunately, a performance delay time of HARQ increases as well.

Instead, if BTS directly handles the ACK and, NAK signals, there occurs no delay problem between BSC and BTS. Yet, all BTSs in the active set may generate ACK or NAK signals which are different respectively, whereby the terminal is unable to apply the soft combining to these signals.

When the ACK signal is received from at least one of BTSs in the active set, the retransmission for the corresponding packet fails to occur in the terminal.

Moreover, for the structure of a forward channel to transmit ACK and NACK signals, there are various methods of forming a forward channel to transmit ACK and NACK signals to a terminal. One method is to form one independent physical channel for thee transmission of ACK and NAK signals. And, the other method is to use both of the channel for reverse dedicate rate control and the physical channel in common.

First, one independent physical channel is formed to transmit ACK and NAK signals In this case, various users are preferred to be accommodated in one common channel instead of using the respective physical channels for ACK and NAK signals transferred, to the respective terminals.

Moreover, a channel for a dedicate rate control is required. Through this channel, RRC(reverse rate control) information is transferred to the terminals which are transmitting packet data through the current reverse link channel by packet unit. And, it is able to multiplex this channel into one common physical channel with ACK/NAK signals.

Such a multiplexing enables to save Walsh code.

FIG. 12 illustrates a block diagram of a channel for ACK/NACK transmission and a channel multiplexing a reverse rate control channel according to the second embodiment of the present intention, in which the corresponding channels are multiplexed using one Walsh code, Referring to FIG. 12, blocks for a reverse common control channel includes repetition blocks 601, 605, 609, and 613, signal point mapping blocks 602, 606, 610, and 614, channel gain parts 603, 607, 611, and 615, multiplexers 604 and 612, a relative offset calculation part 608, a decimator 616, and a long code generator 617.

RRC bits for a reverse data rate control are transmitted to a branch-I and ACK or NACK bits are transmitted to a branch-Q, and vice versa. This above-generated channel will be called F-CRCCH (forward common reverse control channel).

The branch-I and branch-Q define the respective channels having a phase difference, which generally means a vertical phase difference.

Namely, two kinds of sub-channels, F-CRCCH(forward common rate control channel) and F-CACKCH(forward common acknowledgement channel), are multiplexed in one F-CRCCH.

And, F-CRCCH enables accommodate control information for 24 or 48 users.

If 24 users are accommodated, ACK or NACK bits are repeated 8 times. In this case, positions of the repeated bits for more diversity gain are arranged with uniform intervals for total 20 ms packet time. Namely, if one packet is divided into 16 power control groups(PCG), the control information is transmitted once every 2 PCG.

If 48 users are accommodated in one F-CRCCH, the control information is repeated four times and transmitted every 4 PCG.

The repetition blocks 610, 605, 609, and 613 use the ACK/NACK bit or the respective rate control bits for a plurality of users as their inputs, and repeat the bits for the repeated transmission for 20 ms packet time every PCG section.

Each of the signal point mapping blocks 602, 606, 610, and 614 carries out mapping on 0 into +1, 1 into −1, and none(no transmission bit) into 0 among the repeated bit values. It the number of the users is 24, the number of symbols at a point A or point C through the signal point mapping blocks 602, 606, 610, and 614 output one symbol every 2 PCG sections. And, if the number of users is 48, one symbol is outputted every 4 PCG sections.

The channel gain parts 603, 607, 611, and 615 adjust channel gains of the respective bits for the corresponding users. The channel gain parts allocate the different channel gain values for the corresponding users, respectively(point B or point D).

The multiplexers 604 and 612 carry out multiplexing on the rate control bits of the respective users of which gains are adjusted or ACK/NACK bits of the respective users. In this case, the multiplexers 604 and 612 adjust offset values of the respective users in accordance with the offset value provided by the relative offset calculation part 608.

The long code generator 617 generates long codes which are different in accordance with a long code mask for the reverse control channel, and the decimator 616 detects the long codes by chip unit so as to provide the relative calculation part 608 with the detected long codes. Accordingly, the relative offset calculation part 608 calculates the offset values of the respective users so as to provide the multiplexers 604 and 612 with the calculated offset values.

Meanwhile, the reverse channel informing the data rate of the reverse link is generated by the following manners R-NPDCH channel is a channel of a variable data rate in which the data rate can vary basically. Hence, a reverse rate indication channel(hereinafter abbreviated RRI channel), which informs the data rate of the current R-NPDCH, exists in the reverse link. In this case, the data rate for R-RPDCH of the present invention is already known to the base transceiver system(BTS), whereby clear indication is unnecessary. In the current reverse transmission, additional information of one bit is necessary for informing whether the transmission of a new packet and, the other transmission of a packet, in which NACK occurs, are multiplexed reciprocally.

Accordingly, the present invention designs the HARQ system effective in the reverse link of the present 1×-EV DV, thereby enabling to increase an effect of data throughput of the reverse link.

Moreover, the present invention enables to design an effective combination of the reverse link dedicated rate control method and the HARQ system, which is enabled by using the HARQ system using Type-II or Type-III using an incremental redundancy system, or the chase combining or partial combining of the Type-I HARQ system.

The HARQ system of the reverse link enables to use the method of reducing the receiving energy of the retransmitted packet down to the energy received at the initial transmission. Such a method can be applied to the transmission for the new using the spare energy space, thereby increasing the throughput of the reverse link.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method of transmitting retransmission packets in a mobile communications system supporting an automatic repeat request (ARQ) or hybrid automatic repeat request (HARQ) scheme, comprising:
   receiving a non-acknowledgement (NACK) signal transmitted by a receiving side as a response to a packet transmitted to the receiving side; and
   transmitting a retransmission packet to the receiving side, wherein a traffic to pilot power ratio (T/P) of the retransmission packet is adjusted to be less than a T/P of the transmitted packet, and wherein a ratio of the T/P of the retransmission packet to the T/P of the transmitted packet is a predetermined value.

2. The method of claim 1, wherein the predetermined value is any one of 0.5, 0.25, or and 0.125.

3. The method of claim 1, further comprising transmitting a new packet to the receiving side.

4. The method of claim 3, wherein a transmission energy of the new packet is a remaining part of an available data transmission energy except a transmission energy for the retransmission packet.

5. The method of claim 4, wherein the available transmission energy is adjusted so that a receiving total energy at the receiving side is maintained at a uniform level.

6. The method of claim 3, wherein the retransmission packet and the new packet are transmitted simultaneously.

7. The method of claim 6, wherein a time division multiplexing (TDM) or a code division multiplexing (CDM) scheme is used for transmitting the retransmission packet and the new packet.

8. The method of claim 7, wherein data processing procedures for each of the retransmission packet and the new packet before being transmitted comprises:
   encoding input data by a turbo code having a code rate of 1/5;
   interleaving the encoded data so as to separate a transmission redundancy code to be transmitted from a non-transmission redundancy code not to be transmitted in the encoded data; and
   symbol-repeating or pruning the interleaved data including the transmission redundancy code.

* * * * *